US 11,675,471 B2
Jun. 13, 2023

(12) United States Patent
Luquetta-Fish et al.

(54) OPTIMIZED JOINT DOCUMENT REVIEW

(71) Applicant: Microsoft Technology Licensing, LLC, Redmond, WA (US)

(72) Inventors: Nathan James Luquetta-Fish, Seattle, WA (US); Jeffrey Berg, Seattle, WA (US); Joo Young Lee, Redmond, WA (US); Derek Matthias Hans, Seattle, WA (US); Kuldeep Karnawat, Seattle, WA (US); Joseph Freeman Friend, Bothell, WA (US); Nino Yuniardi, Seattle, WA (US); David Benjamin Lee, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 327 days.

This patent is subject to a terminal disclaimer.

(21) Appl. No.: 15/187,990

(22) Filed: Jun. 21, 2016

(65) Prior Publication Data

US 2016/0299640 A1 Oct. 13, 2016

Related U.S. Application Data

(63) Continuation of application No. 12/968,287, filed on Dec. 15, 2010, now Pat. No. 9,383,888.

(51) Int. Cl.
*G06F 3/0481* (2022.01)
*G06Q 10/10* (2012.01)
(Continued)

(52) U.S. Cl.
CPC .......... *G06F 3/0481* (2013.01); *G06F 3/0488* (2013.01); *G06F 3/04842* (2013.01);
(Continued)

(58) Field of Classification Search
CPC .. G06F 3/0481; G06F 3/04842; G06F 3/0488; G06F 17/24; G06F 17/241; G06Q 10/10; G06Q 10/101
See application file for complete search history.

(56) References Cited

U.S. PATENT DOCUMENTS 4,540,850 A 9/1985 Herr et al.
4,831,552 A 5/1989 Scully et al.
(Continued)

FOREIGN PATENT DOCUMENTS

CN 1886977 12/2006
CN 101198976 6/2008
(Continued)

OTHER PUBLICATIONS

Author: David S. Miller, John G. Smith, and Michael J. Muller Title: TelePICTIVE: Computer-Supported Collaborative GUI, Design for Designers with Diverse Expertise Date: Nov. 1992 pp. 115-160 (Year: 1992).*

(Continued)

*Primary Examiner* — Kavita Stanley
*Assistant Examiner* — Phoebe X Pan
(74) *Attorney, Agent, or Firm* — NovoTechIP International PLLC

(57) ABSTRACT

A UI for presenting and reviewing a document is optimized based upon the type of computing device being utilized to present the document. One such UI includes a first pane showing a view of the document under review that is sized and formatted for display on a large-format display device. The first pane can also be utilized to emphasize a portion of the document. The UI also includes a second pane that includes indicators for each of the reviewers of the document. The selection of an indicator will cause a portion of the document being reviewed by the corresponding reviewer (Continued)

to be displayed in the first pane. The UI also includes a third pane that includes a scaled image of the document shown in the first pane. Selection of a portion of the scaled image causes the selected portion of the document to be displayed in the first pane.

19 Claims, 6 Drawing Sheets

(51) Int. Cl.
    *G06F 3/04842*     (2022.01)
    *G06F 40/166*     (2020.01)
    *G06F 40/169*     (2020.01)
    *G06F 3/0488*     (2022.01)
    *G06Q 10/101*     (2023.01)

(52) U.S. Cl.
    CPC .......... *G06F 40/166* (2020.01); *G06F 40/169* (2020.01); *G06Q 10/10* (2013.01); *G06F 2203/04803* (2013.01); *G06Q 10/101* (2013.01)

(56) References Cited

U.S. PATENT DOCUMENTS

| | | | |
|---|---|---|---|
| 4,974,173 A * | 11/1990 | Stefik | G06F 9/451 715/751 |
| 5,008,853 A * | 4/1991 | Bly | G06F 16/1774 715/751 |
| 5,107,443 A * | 4/1992 | Smith | G06Q 10/10 713/166 |
| 5,280,583 A * | 1/1994 | Nakayama | G06F 3/0481 709/205 |
| 5,297,250 A | 3/1994 | Leroy et al. | |
| 5,337,407 A | 8/1994 | Bates et al. | |
| 5,339,389 A | 8/1994 | Bates et al. | |
| 5,339,391 A * | 8/1994 | Wroblewski | G06F 3/04855 345/607 |
| 5,495,269 A | 2/1996 | Elrod et al. | |
| 5,566,291 A | 10/1996 | Boulton et al. | |
| 5,644,692 A * | 7/1997 | Eick | G06F 3/04847 345/473 |
| 5,675,752 A | 10/1997 | Scott et al. | |
| 5,704,029 A | 12/1997 | Wright, Jr. | |
| 5,717,869 A | 2/1998 | Moran et al. | |
| 5,742,777 A * | 4/1998 | Eick | G06F 3/04847 715/787 |
| 5,772,446 A * | 6/1998 | Rosen | G09B 5/02 434/307 R |
| 5,793,369 A * | 8/1998 | Atkins | G06F 3/04847 714/E11.181 |
| 5,802,299 A | 9/1998 | Logan et al. | |
| 5,821,925 A | 10/1998 | Carey et al. | |
| 5,821,932 A | 10/1998 | Pittore | |
| 5,872,924 A * | 2/1999 | Nakayama | G06F 3/1454 709/205 |
| 5,893,098 A | 4/1999 | Peters et al. | |
| 5,907,324 A | 5/1999 | Larson et al. | |
| 6,016,478 A | 1/2000 | Zhang et al. | |
| 6,018,346 A | 1/2000 | Moran et al. | |
| 6,049,334 A * | 4/2000 | Bates | G06F 3/0481 715/745 |
| 6,072,463 A * | 6/2000 | Glaser | G06F 3/038 715/753 |
| 6,119,147 A | 9/2000 | Toomey et al. | |
| 6,192,395 B1 | 2/2001 | Lerner et al. | |
| 6,208,339 B1 | 3/2001 | Atlas et al. | |
| 6,230,185 B1 | 5/2001 | Salas et al. | |
| 6,310,633 B1 * | 10/2001 | Graham | G06F 3/0481 707/999.006 |
| 6,353,436 B1 | 3/2002 | Reichlen | |
| 6,466,250 B1 * | 10/2002 | Hein | H04N 7/144 348/14.16 |
| 6,553,417 B1 | 4/2003 | Gampper | |
| 6,564,246 B1 | 5/2003 | Varma et al. | |
| 6,633,315 B1 | 10/2003 | Sobeski et al. | |
| 6,670,970 B1 | 12/2003 | Bonura et al. | |
| 6,735,615 B1 | 5/2004 | Iwayama et al. | |
| 6,738,075 B1 | 5/2004 | Torres et al. | |
| 7,035,865 B2 | 4/2006 | Doss et al. | |
| 7,036,076 B2 | 4/2006 | Anwar | |
| 7,051,285 B1 | 5/2006 | Harrison et al. | |
| 7,058,891 B2 * | 6/2006 | O'Neal | G01N 30/56 348/E5.137 |
| 7,073,127 B2 | 7/2006 | Zhao et al. | |
| 7,075,513 B2 | 7/2006 | Silfverberg et al. | |
| 7,124,164 B1 | 10/2006 | Chemtob | |
| 7,171,567 B1 | 1/2007 | Bayer et al. | |
| 7,203,479 B2 | 4/2007 | Deeds | |
| 7,225,257 B2 | 5/2007 | Aoike et al. | |
| 7,228,492 B1 | 6/2007 | Graham | |
| 7,233,933 B2 | 6/2007 | Horvitz et al. | |
| 7,242,389 B1 | 7/2007 | Stern | |
| 7,246,316 B2 | 7/2007 | Furlong et al. | |
| 7,248,677 B2 | 7/2007 | Randall et al. | |
| 7,251,786 B2 | 7/2007 | Wynn et al. | |
| 7,257,769 B2 | 8/2007 | Caspi | |
| 7,269,787 B2 | 9/2007 | Amitay et al. | |
| 7,299,193 B2 | 11/2007 | Cragun et al. | |
| 7,299,405 B1 | 11/2007 | Lee et al. | |
| 7,299,418 B2 | 11/2007 | Dieberger | |
| 7,401,300 B2 | 7/2008 | Nurmi | |
| 7,421,069 B2 * | 9/2008 | Vernon | H04L 65/4046 379/204.01 |
| 7,426,297 B2 | 9/2008 | Zhang et al. | |
| 7,451,183 B2 | 11/2008 | Romero et al. | |
| 7,451,186 B2 | 11/2008 | Morinigo et al. | |
| 7,454,439 B2 | 11/2008 | Gansner et al. | |
| 7,466,334 B1 | 12/2008 | Baba | |
| 7,469,222 B1 | 12/2008 | Glazer | |
| 7,478,129 B1 | 1/2009 | Chemtob | |
| 7,496,841 B2 * | 2/2009 | Hadfield | G06Q 10/10 715/255 |
| 7,512,906 B1 | 3/2009 | Baier et al. | |
| 7,551,187 B2 * | 6/2009 | Agrawala | G06F 3/04883 345/660 |
| 7,554,576 B2 | 6/2009 | Erol et al. | |
| 7,571,210 B2 | 8/2009 | Swanson et al. | |
| 7,590,941 B2 | 9/2009 | Wee et al. | |
| 7,599,989 B2 | 10/2009 | Stevens et al. | |
| 7,606,862 B2 | 10/2009 | Swearingen et al. | |
| 7,627,830 B1 | 12/2009 | Espinoza et al. | |
| 7,636,754 B2 | 12/2009 | Zhu et al. | |
| 7,640,502 B2 * | 12/2009 | Xu | G06F 3/0481 715/730 |
| 7,640,506 B2 * | 12/2009 | Pratley | G06Q 10/10 715/751 |
| 7,669,141 B1 | 2/2010 | Pegg | |
| 7,679,518 B1 | 3/2010 | Pabla et al. | |
| 7,730,411 B2 | 6/2010 | Chotai et al. | |
| 7,743,098 B2 | 6/2010 | Anglin et al. | |
| 7,764,247 B2 | 7/2010 | Blanco et al. | |
| 7,770,116 B2 | 8/2010 | Zhang et al. | |
| 7,774,221 B2 | 8/2010 | Miller et al. | |
| 7,774,703 B2 | 8/2010 | Junuzovic et al. | |
| 7,818,678 B2 | 10/2010 | Massand | |
| 7,869,941 B2 | 1/2011 | Coughlin et al. | |
| 7,911,409 B1 | 3/2011 | Chatterjee et al. | |
| 7,937,663 B2 * | 5/2011 | Parker | G06F 3/0483 715/751 |
| 7,941,399 B2 | 5/2011 | Bailor et al. | |
| 7,962,525 B2 | 6/2011 | Kansal | |
| 7,984,387 B2 | 7/2011 | Batthish et al. | |
| 7,992,089 B2 | 8/2011 | Murray et al. | |
| 8,032,832 B2 | 10/2011 | Russ et al. | |
| 8,086,960 B1 * | 12/2011 | Gopalakrishna | G06F 16/986 715/266 |
| 8,099,458 B2 | 1/2012 | Burtner, IV et al. | |
| 8,126,974 B2 | 2/2012 | Lyle et al. | |
| 8,150,719 B2 | 4/2012 | Perrella et al. | |
| 8,161,419 B2 | 4/2012 | Palahnuk et al. | |

(56) References Cited

U.S. PATENT DOCUMENTS

| | | | |
|---|---|---|---|
| 8,204,942 B2 | 6/2012 | Roskind et al. | |
| 8,214,748 B2 | 7/2012 | Srikanth et al. | |
| 8,330,795 B2 | 12/2012 | Iyer et al. | |
| 8,352,870 B2 | 1/2013 | Bailor et al. | |
| 8,358,762 B1 | 1/2013 | Renner et al. | |
| 8,385,964 B2 | 2/2013 | Haney | |
| 8,423,883 B1 | 4/2013 | Stockman | |
| 8,437,461 B1 | 5/2013 | Gartner et al. | |
| 8,452,839 B2 | 5/2013 | Heikes et al. | |
| 8,560,487 B2 | 10/2013 | Jhoney et al. | |
| 8,583,148 B2 | 11/2013 | Ollila et al. | |
| 8,606,517 B1 | 12/2013 | Ehrlacher et al. | |
| 8,631,119 B2 | 1/2014 | Malkin et al. | |
| 8,667,401 B1 | 3/2014 | Lozben | |
| 8,682,973 B2 | 3/2014 | Kikin-Gil et al. | |
| 8,688,694 B2 * | 4/2014 | Dexter | G06F 16/951 707/726 |
| 8,768,308 B2 | 7/2014 | Kim et al. | |
| 8,775,511 B2 * | 7/2014 | Vernon | H04L 65/1083 709/204 |
| 9,118,612 B2 | 8/2015 | Fish et al. | |
| 9,189,143 B2 * | 11/2015 | Jones | G06F 3/0488 |
| 9,342,267 B2 * | 5/2016 | Huang | G06F 3/1462 |
| 9,383,888 B2 | 7/2016 | Fish et al. | |
| 10,152,190 B2 * | 12/2018 | Jones | G06Q 10/10 |
| 10,505,998 B1 * | 12/2019 | Ackerman | H04N 7/152 |
| 2001/0040592 A1 | 11/2001 | Foreman et al. | |
| 2002/0049786 A1 * | 4/2002 | Bibliowicz | G06Q 10/10 715/211 |
| 2002/0067380 A1 * | 6/2002 | Graham | G06F 3/0481 715/838 |
| 2002/0143876 A1 | 10/2002 | Boyer et al. | |
| 2002/0143877 A1 | 10/2002 | Hackbarth et al. | |
| 2003/0020805 A1 | 1/2003 | Mien et al. | |
| 2003/0046296 A1 | 3/2003 | Doss et al. | |
| 2003/0105816 A1 * | 6/2003 | Goswami | G06Q 10/10 709/204 |
| 2003/0122863 A1 | 7/2003 | Dieberger et al. | |
| 2003/0137539 A1 | 7/2003 | Dees | |
| 2003/0142133 A1 | 7/2003 | Brown et al. | |
| 2003/0158900 A1 | 8/2003 | Santos | |
| 2003/0179230 A1 | 9/2003 | Seidman | |
| 2003/0220973 A1 | 11/2003 | Zhu et al. | |
| 2003/0222890 A1 | 12/2003 | Salesin et al. | |
| 2004/0024822 A1 | 2/2004 | Werndorfer et al. | |
| 2004/0027370 A1 | 2/2004 | Jaeger | |
| 2004/0030992 A1 | 2/2004 | Moisa et al. | |
| 2004/0062383 A1 | 4/2004 | Sylvain | |
| 2004/0085354 A1 | 5/2004 | Massand | |
| 2004/0128350 A1 | 7/2004 | Topfl et al. | |
| 2004/0133601 A1 * | 7/2004 | Graham | G06F 16/9535 |
| 2004/0150627 A1 | 8/2004 | Luman et al. | |
| 2004/0161090 A1 | 8/2004 | Digate et al. | |
| 2004/0169683 A1 | 9/2004 | Chiu et al. | |
| 2004/0175036 A1 | 9/2004 | Graham | |
| 2004/0194033 A1 | 9/2004 | Holzwarth et al. | |
| 2004/0196286 A1 | 10/2004 | Guzik | |
| 2004/0230594 A1 | 11/2004 | Flam et al. | |
| 2004/0250201 A1 | 12/2004 | Caspi | |
| 2004/0254998 A1 | 12/2004 | Horvitz | |
| 2004/0263636 A1 | 12/2004 | Cutler et al. | |
| 2004/0267701 A1 | 12/2004 | Horvitz et al. | |
| 2005/0005025 A1 | 1/2005 | Harville et al. | |
| 2005/0018828 A1 | 1/2005 | Nierhaus et al. | |
| 2005/0055625 A1 | 3/2005 | Kloss | |
| 2005/0081160 A1 | 4/2005 | Wee et al. | |
| 2005/0088410 A1 | 4/2005 | Chaudhri | |
| 2005/0091571 A1 | 4/2005 | Leichtling | |
| 2005/0125246 A1 | 6/2005 | Muller et al. | |
| 2005/0125717 A1 | 6/2005 | Segal et al. | |
| 2005/0138109 A1 | 6/2005 | Redlich et al. | |
| 2005/0138570 A1 | 6/2005 | Good et al. | |
| 2005/0171830 A1 | 8/2005 | Miller et al. | |
| 2005/0285845 A1 | 12/2005 | Dehlin | |
| 2006/0004911 A1 | 1/2006 | Becker et al. | |
| 2006/0010023 A1 | 1/2006 | Tromczynski et al. | |
| 2006/0010197 A1 | 1/2006 | Ovenden | |
| 2006/0026253 A1 | 2/2006 | Kessen et al. | |
| 2006/0053196 A1 * | 3/2006 | Spataro | H04L 65/403 709/205 |
| 2006/0053380 A1 | 3/2006 | Spataro et al. | |
| 2006/0067250 A1 | 3/2006 | Boyer et al. | |
| 2006/0080610 A1 | 4/2006 | Kaminsky | |
| 2006/0082594 A1 | 4/2006 | Vafiadis et al. | |
| 2006/0094441 A1 | 5/2006 | Beckmann et al. | |
| 2006/0132507 A1 | 6/2006 | Wang | |
| 2006/0136828 A1 | 6/2006 | Asano | |
| 2006/0139375 A1 * | 6/2006 | Rasmussen | G01C 21/32 345/641 |
| 2006/0143064 A1 | 6/2006 | Mock et al. | |
| 2006/0146765 A1 | 7/2006 | Van De Sluis et al. | |
| 2006/0161585 A1 | 7/2006 | Clarke et al. | |
| 2006/0167996 A1 | 7/2006 | Drsolini et al. | |
| 2006/0168533 A1 | 7/2006 | Yip et al. | |
| 2006/0171515 A1 | 8/2006 | Hintermeister et al. | |
| 2006/0184872 A1 | 8/2006 | Dontcheva et al. | |
| 2006/0190547 A1 | 8/2006 | Bhogal et al. | |
| 2006/0195587 A1 | 8/2006 | Cadiz et al. | |
| 2006/0234735 A1 | 10/2006 | Digate et al. | |
| 2006/0239212 A1 | 10/2006 | Pirzada et al. | |
| 2006/0259875 A1 | 11/2006 | Collins et al. | |
| 2006/0265398 A1 | 11/2006 | Kaufman | |
| 2006/0282759 A1 | 12/2006 | Collins et al. | |
| 2007/0005752 A1 | 1/2007 | Chawla et al. | |
| 2007/0011231 A1 | 1/2007 | Manion et al. | |
| 2007/0033091 A1 | 2/2007 | Ravikumar et al. | |
| 2007/0044017 A1 * | 2/2007 | Zhu | G06F 17/24 715/209 |
| 2007/0083597 A1 | 4/2007 | Salesky et al. | |
| 2007/0100937 A1 | 5/2007 | Burtner et al. | |
| 2007/0109939 A1 | 5/2007 | Shimizu et al. | |
| 2007/0112926 A1 | 5/2007 | Brett et al. | |
| 2007/0150583 A1 | 6/2007 | Asthana et al. | |
| 2007/0168447 A1 | 7/2007 | Chen et al. | |
| 2007/0174389 A1 | 7/2007 | Armstrong et al. | |
| 2007/0185870 A1 | 8/2007 | Hogue et al. | |
| 2007/0186007 A1 * | 8/2007 | Field | G06Q 30/02 709/233 |
| 2007/0186171 A1 | 8/2007 | Junuzovic et al. | |
| 2007/0189487 A1 | 8/2007 | Sharland et al. | |
| 2007/0214423 A1 | 9/2007 | Teplov et al. | |
| 2007/0216675 A1 * | 9/2007 | Sun | G06T 11/00 345/419 |
| 2007/0219645 A1 | 9/2007 | Thomas et al. | |
| 2007/0226032 A1 | 9/2007 | White et al. | |
| 2007/0226299 A1 | 9/2007 | Shaffer et al. | |
| 2007/0245238 A1 | 10/2007 | Fugitt et al. | |
| 2007/0253424 A1 | 11/2007 | Herat et al. | |
| 2007/0271503 A1 * | 11/2007 | Harmon | G06F 17/241 715/230 |
| 2007/0276909 A1 | 11/2007 | Chavda et al. | |
| 2007/0279416 A1 | 12/2007 | Cobb et al. | |
| 2007/0294612 A1 | 12/2007 | Drucker et al. | |
| 2007/0300185 A1 | 12/2007 | Macbeth et al. | |
| 2008/0001717 A1 | 1/2008 | Fiatal | |
| 2008/0005235 A1 | 1/2008 | Hegde et al. | |
| 2008/0008458 A1 | 1/2008 | Gudipaty et al. | |
| 2008/0013698 A1 | 1/2008 | Holtzberg | |
| 2008/0022225 A1 | 1/2008 | Erl | |
| 2008/0028314 A1 * | 1/2008 | Bono | G11B 27/034 715/732 |
| 2008/0040187 A1 | 2/2008 | Carraher et al. | |
| 2008/0040188 A1 | 2/2008 | Klausmeier | |
| 2008/0046828 A1 * | 2/2008 | Bibliowicz | G06Q 10/10 715/751 |
| 2008/0059889 A1 | 3/2008 | Parker et al. | |
| 2008/0065580 A1 | 3/2008 | Spence et al. | |
| 2008/0084984 A1 | 4/2008 | Levy et al. | |
| 2008/0098328 A1 | 4/2008 | Rollin et al. | |
| 2008/0109406 A1 | 5/2008 | Krishnasamy et al. | |
| 2008/0114844 A1 | 5/2008 | Sanchez et al. | |
| 2008/0115076 A1 | 5/2008 | Frank et al. | |

(56) References Cited

U.S. PATENT DOCUMENTS

| | | |
|---|---|---|
| 2008/0133551 A1 | 6/2008 | Wensley et al. |
| 2008/0136897 A1 | 6/2008 | Morishima et al. |
| 2008/0141126 A1 | 6/2008 | Johnson et al. |
| 2008/0147790 A1 | 6/2008 | Malaney et al. |
| 2008/0148146 A1* | 6/2008 | Estrada ............ G06F 17/30873 715/255 |
| 2008/0177782 A1 | 7/2008 | Poston et al. |
| 2008/0189624 A1 | 8/2008 | Chotai et al. |
| 2008/0239995 A1 | 10/2008 | Lee et al. |
| 2008/0244442 A1 | 10/2008 | Veselova et al. |
| 2008/0263010 A1 | 10/2008 | Roychoudhuri et al. |
| 2008/0263460 A1 | 10/2008 | Altberg et al. |
| 2008/0276174 A1 | 11/2008 | Hintermeister et al. |
| 2008/0288889 A1 | 11/2008 | Hunt et al. |
| 2008/0300944 A1 | 12/2008 | Surazski et al. |
| 2008/0303746 A1 | 12/2008 | Schlottmann et al. |
| 2008/0307322 A1 | 12/2008 | Stochosky et al. |
| 2008/0320082 A1 | 12/2008 | Kuhlke et al. |
| 2009/0006980 A1 | 1/2009 | Hawley et al. |
| 2009/0006982 A1 | 1/2009 | Curtis et al. |
| 2009/0019367 A1 | 1/2009 | Cavagnar et al. |
| 2009/0030766 A1 | 1/2009 | Denner et al. |
| 2009/0043856 A1 | 2/2009 | Darby |
| 2009/0055739 A1 | 2/2009 | Murillo et al. |
| 2009/0089055 A1 | 4/2009 | Caspi et al. |
| 2009/0094367 A1 | 4/2009 | Song et al. |
| 2009/0109180 A1 | 4/2009 | Do et al. |
| 2009/0119255 A1 | 5/2009 | Frank et al. |
| 2009/0119604 A1 | 5/2009 | Simard et al. |
| 2009/0129596 A1 | 5/2009 | Chavez et al. |
| 2009/0138552 A1 | 5/2009 | Johnson et al. |
| 2009/0138826 A1 | 5/2009 | Barros |
| 2009/0144654 A1* | 6/2009 | Brouwer ................ G06Q 30/02 715/802 |
| 2009/0199078 A1* | 8/2009 | Caspi .................... H04N 7/152 715/202 |
| 2009/0204465 A1 | 8/2009 | Pradhan |
| 2009/0204671 A1 | 8/2009 | Hawkins et al. |
| 2009/0210822 A1 | 8/2009 | Schindler |
| 2009/0222741 A1 | 9/2009 | Shaw et al. |
| 2009/0228569 A1 | 9/2009 | Kalmanje et al. |
| 2009/0234721 A1 | 9/2009 | Bigelow et al. |
| 2009/0235155 A1* | 9/2009 | Ueda .................... G06F 17/241 715/233 |
| 2009/0235177 A1 | 9/2009 | Saul et al. |
| 2009/0251457 A1* | 10/2009 | Walker .................. G06Q 10/00 345/418 |
| 2009/0254840 A1* | 10/2009 | Churchill .............. G06F 3/0481 715/753 |
| 2009/0254843 A1 | 10/2009 | Van Wie et al. |
| 2009/0265632 A1 | 10/2009 | Russ et al. |
| 2009/0282339 A1 | 11/2009 | Van Melle et al. |
| 2009/0309846 A1 | 12/2009 | Trachtenberg et al. |
| 2009/0313584 A1 | 12/2009 | Kerr et al. |
| 2009/0327019 A1 | 12/2009 | Addae et al. |
| 2009/0327425 A1 | 12/2009 | Gudipaty |
| 2010/0005169 A1* | 1/2010 | Von Hilgers ........... G06Q 10/00 709/224 |
| 2010/0031152 A1 | 2/2010 | Villaron et al. |
| 2010/0037151 A1 | 2/2010 | Ackerman et al. |
| 2010/0037153 A1* | 2/2010 | Rogers ................... G06Q 10/10 715/758 |
| 2010/0058201 A1 | 3/2010 | Harvey et al. |
| 2010/0079467 A1 | 4/2010 | Boss et al. |
| 2010/0095198 A1 | 4/2010 | Bultrowicz et al. |
| 2010/0097331 A1 | 4/2010 | Wu |
| 2010/0131868 A1 | 5/2010 | Chawla et al. |
| 2010/0138756 A1 | 6/2010 | Saund et al. |
| 2010/0149307 A1 | 6/2010 | Iyer et al. |
| 2010/0192107 A1* | 7/2010 | Takahashi ........... H04L 12/1827 715/856 |
| 2010/0199191 A1* | 8/2010 | Takahashi .............. G06F 3/0481 715/741 |
| 2010/0205667 A1* | 8/2010 | Anderson ............... G06F 3/013 726/19 |
| 2010/0235216 A1 | 9/2010 | Hehmeyer et al. |
| 2010/0235763 A1 | 9/2010 | Massand |
| 2010/0241968 A1 | 9/2010 | Tarara et al. |
| 2010/0251140 A1 | 9/2010 | Tipirneni |
| 2010/0268705 A1 | 10/2010 | Douglas et al. |
| 2010/0295958 A1 | 11/2010 | Larsson et al. |
| 2010/0306004 A1 | 12/2010 | Burtner et al. |
| 2010/0306018 A1 | 12/2010 | Burtner et al. |
| 2010/0324963 A1 | 12/2010 | Gupta et al. |
| 2010/0332977 A1* | 12/2010 | Nelson .................. G06Q 10/10 715/273 |
| 2011/0087764 A1* | 4/2011 | Yaffe ..................... G06Q 10/10 709/223 |
| 2011/0107241 A1 | 5/2011 | Moore |
| 2011/0113351 A1 | 5/2011 | Phillips |
| 2011/0137894 A1 | 6/2011 | Narayanan et al. |
| 2011/0154180 A1 | 6/2011 | Evanitsky et al. |
| 2011/0154192 A1 | 6/2011 | Yang et al. |
| 2011/0167366 A1* | 7/2011 | Wagner ................. G06F 3/0483 715/765 |
| 2011/0185288 A1 | 7/2011 | Gupta et al. |
| 2011/0185297 A1* | 7/2011 | Reid .................... G06F 3/04845 715/765 |
| 2011/0212430 A1 | 9/2011 | Smithmier et al. |
| 2011/0225494 A1* | 9/2011 | Shmuylovich ...... G06F 3/04883 715/705 |
| 2011/0239142 A1 | 9/2011 | Steeves et al. |
| 2011/0282871 A1 | 11/2011 | Seefeld et al. |
| 2011/0289404 A1* | 11/2011 | Fleur .................... G06F 17/241 715/255 |
| 2011/0295879 A1 | 12/2011 | Logis et al. |
| 2012/0017149 A1* | 1/2012 | Lai ....................... H04L 65/1069 715/716 |
| 2012/0075337 A1 | 3/2012 | Rasmussen et al. |
| 2012/0144325 A1 | 6/2012 | Mital et al. |
| 2012/0150577 A1 | 6/2012 | Berg et al. |
| 2012/0150863 A1 | 6/2012 | Fish et al. |
| 2012/0159347 A1 | 6/2012 | Fish et al. |
| 2012/0166985 A1 | 6/2012 | Friend et al. |
| 2012/0233543 A1 | 9/2012 | Vagell et al. |
| 2012/0254858 A1* | 10/2012 | Moyers ................. H04L 51/04 717/177 |
| 2013/0035853 A1 | 2/2013 | Stout et al. |
| 2013/0091205 A1 | 4/2013 | Kotler et al. |
| 2013/0091440 A1 | 4/2013 | Kotler et al. |
| 2013/0091465 A1 | 4/2013 | Kikin-Gil et al. |
| 2013/0097544 A1 | 4/2013 | Parker et al. |
| 2013/0101978 A1 | 4/2013 | Ahl et al. |
| 2013/0111360 A1* | 5/2013 | Kodama ................ G06F 21/56 715/753 |
| 2013/0124978 A1 | 5/2013 | Horns et al. |
| 2013/0125051 A1 | 5/2013 | Kelley et al. |
| 2013/0132455 A1* | 5/2013 | Mangini ................ G06Q 10/10 709/201 |
| 2013/0132814 A1* | 5/2013 | Mangini ................ G06F 40/169 715/230 |
| 2013/0132886 A1 | 5/2013 | Mangini et al. |
| 2013/0246903 A1 | 9/2013 | Mukai |
| 2014/0032481 A1 | 1/2014 | Lang |
| 2014/0033067 A1* | 1/2014 | Pittenger .............. G06Q 10/101 715/751 |
| 2014/0033088 A1 | 1/2014 | Shaver |
| 2014/0129645 A1* | 5/2014 | Mo ....................... G06Q 10/101 709/205 |
| 2014/0207867 A1 | 7/2014 | Kotler et al. |
| 2014/0362165 A1* | 12/2014 | Ackerman .......... H04L 65/4076 348/14.07 |
| 2015/0127628 A1 | 5/2015 | Rathod |
| 2015/0293650 A1* | 10/2015 | Dukhovny ........... G06Q 10/103 715/732 |

(56) References Cited

U.S. PATENT DOCUMENTS

| | | | | |
|---|---|---|---|---|
| 2015/0309766 A1* | 10/2015 | Huang | ............... | G06F 3/1462<br>345/2.2 |
| 2016/0011766 A1* | 1/2016 | Kosaka | ............... | G06F 3/0488<br>715/787 |

FOREIGN PATENT DOCUMENTS

| | | |
|---|---|---|
| CN | 101363739 | 2/2009 |
| CN | 101364886 | 2/2009 |
| CN | 101515226 | 8/2009 |
| CN | 101789871 | 7/2010 |
| EP | 1517260 | 3/2005 |
| JP | 04257046 | 9/1992 |
| JP | 2010176320 | 8/2010 |
| RU | 2005139793 | 6/2007 |
| WO | 02/061682 | 8/2002 |
| WO | 2007/092470 | 8/2007 |

OTHER PUBLICATIONS

"Foreign Office Action", CN Application No. 201110443291.8, dated Jan. 24, 2014, 12 pages.
"Foreign Office Action", CN Application No. 201110443291.8, dated Jul. 24, 2014, 10 pages.
"Foreign Office Action", CN Application No. 201110443291.8, dated Nov. 21, 2014, 8 pages.
"Free PhotoMesa 3.1.2 (Windows)", Retrieved From: https://web.archive.org/web/20071209231951/http://www.windsorinterfaces.com/photomesa.shtml, 2007, 2 pages.
"FREEPATH-EDU Nonlinear Presentation Software", Grass Roots Software, 2008, 3 pages.
"GeoTime", Retrieved at: https://web.archive.org/web/20101219085705/http://www.geotime.com/Product- /GeoTime-%281%29/Features---Benefits.aspx, 2009, 10 pages.
"GoToMeeting", Retrieved from: <http://www.gotomeeting.com/fec/online_meeting> on Oct. 11, 2010, 1 page.
"Human and Technical Factors of Distributed Group Drawing Tools", Retrieved From: http://grouplab.cpsc.ucalgary.ca/grouplab/uploads/Publications/Publications/1992-HumanTech.IWC.pdf, 1992, 29 pages.
"International Search Report and Written Opinion", Application No. PCT/US2009/046529, Nov. 30, 2009, 11 pages.
"Meet mimio—The Digital Meeting Assistant", Mayflower Business Systems Limited; http://www.kda.co.uk/mimio1/whitepaper.html, (May 1999), 10 pages.
"Meeting Center Using Video in Your Meetings", Retrieved From: http://www.oucs.ox.ac.uk/webex/Windows/Video.pdf, May 13, 2009, 2 pages.
"Meeting Management Software", Retrieved from: <http://workingsmarter.typepad.com/my_weblog/2004/12/meeting_managem.html> on Oct. 11, 2010, (Dec. 10, 2004), 2 pages.
"Microsoft Office Communicator 2007 Getting Started Guide", retrieved from http://www.ittdublin.ie/media/Media,22233,en.pdf, (Jul. 2007), 77 pages.
"Microsoft® Office Live Meeting Feature Guide", Microsoft Corporation, Available at <http://download.microsoft.com/download/8/0/3/803f9ba6-5e12-4b40-84d9-d8a91073e3dc/LiveMeeting.doc>, (Jan. 2005), pp. 1-17.
"Mindshift Innovation", Retrieved From: http://mindshiftinnovation.blogspot.com/2007/09/seadragon.html, Apr. 4, 2007, 2 pages.
"Non-Final Office Action", U.S. Appl. No. 12/486,762, filed Oct. 14, 2011, 24 pages.
"Non-Final Office Action", U.S. Appl. No. 11/260,515, filed Mar. 3, 2009, 16 pages.
"Non-Final Office Action", U.S. Appl. No. 11/260,515, filed Sep. 30, 2010, 17 pages.
"Non-Final Office Action", U.S. Appl. No. 12/184,174, filed Feb. 4, 2011, 16 pages.
"Non-Final Office Action", U.S. Appl. No. 12/184,174, filed Mar. 13, 2012, 19 pages.
"Non-Final Office Action", U.S. Appl. No. 12/184,174, filed Sep. 25, 2013, 16 pages.
"Non-Final Office Action", U.S. Appl. No. 12/472,101, filed Oct. 5, 2011, 15 pages.
"Non-Final Office Action", U.S. Appl. No. 12/472,101, filed Sep. 16, 2014, 10 pages.
"Non-Final Office Action", U.S. Appl. No. 12/473,206, filed May 9, 2011, 28 pages.
"Non-Final Office Action", U.S. Appl. No. 12/473,206, filed Jul. 31, 2014, 41 pages.
"Non-Final Office Action", U.S. Appl. No. 12/473,206, filed Apr. 9, 2015, 55 pages.
"Non-Final Office Action", U.S. Appl. No. 12/486,762, filed Feb. 14, 2013, 29 pages.
"Non-Final Office Action", U.S. Appl. No. 12/965,965, filed Jun. 4, 2012, 12 pages.
"Non-Final Office Action", U.S. Appl. No. 12/965,965, filed Dec. 20, 2013, 16 pages.
"Non-Final Office Action", U.S. Appl. No. 12/965,965, filed Oct. 2, 2014, 14 pages.
"Non-Final Office Action", U.S. Appl. No. 12/967,497, filed Jun. 20, 2013, 19 pages.
"Non-Final Office Action", U.S. Appl. No. 12/967,497, filed Mar. 13, 2015, 21 pages.
"Non-Final Office Action", U.S. Appl. No. 12/968,332, filed Jul. 23, 2012, 19 pages.
"Non-Final Office Action", U.S. Appl. No. 12/968,332, filed Dec. 5, 2013, 20 pages.
"Non-Final Office Action", U.S. Appl. No. 12/968,332, filed Oct. 9, 2014, 23 pages.
"Non-Final Office Action", U.S. Appl. No. 12/978,308, filed Aug. 31, 2012, 17 pages.
"Non-Final Office Action", U.S. Appl. No. 13/253,886, filed Apr. 11, 2013, 13 pages.
"Non-Final Office Action", U.S. Appl. No. 13/253,886, filed Aug. 14, 2014, 15 pages.
"Non-Final Office Action", U.S. Appl. No. 13/272,832, filed Aug. 12, 2013, 15 pages.
"Non-Final Office Action", U.S. Appl. No. 14/225,234, filed Jul. 18, 2014, 5 pages.
"Notice of Allowance", U.S. Appl. No. 12/968,332, filed Apr. 10, 2015, 15 pages.
"Notice on Reexamination", CN Application No. 201110443291.8, dated Aug. 24, 2015, 9 pages.
"Notice on Reexamination", CN Application No. 201110443291.8, dated Jan. 4, 2016, 10 Pages.
"Online Calendar & Group Scheduling", MOSAIC Technologies, retrieved from <http://www.webexone.com/Brandded/ID.asp?brandid=2348&pg=%20AppCalendar> on Apr. 24, 2009, 4 pages.
"ProShow Producer Feature Overview", Photodex Corporation: http://www.photodex.com/products/producer/features.html, 2008, 2 pages.
"The Beginner's Guide to Data Visualization", Retrieved From: http://www.tableausoftware.com/beginners-data-visualization, 2010, 10 pages.
"Visualize and Map SalesForce Leads with SpatiaiKey", Retrieved From: http://web.archive.org/web/20101120170237/http://www.spatialkey.com/support/tutorials/visualize-and-map-salesforce-leads-with-spatialkey-part-ii, 2010, 7 pages.
"ZuiPrezi Nonlinear Presentation Editor", ZuiPrezi Ltd., http://zuiprezi.kibu.hu/, 2007, 2 pages.
Adams, Lia et al., "Distributed Research Teams: Meeting Asynchronously in Virtual Space", Institute of Electrical and Electronics Engineers, (1999), 17 pages.
Author: Adam Pash Title: Google Docs Updates With a Drawing Editor, Real-Time Collaboration, Speed Date: Apr. 13, 2010, pp. 1-5.
"Adobe Connect", Retrieved from: <http://www.adobe.com/acom/connectnow/> on 10/1110, (Sep. 16, 2010), 3 pages.
"Adobe ConnectNow", Retrieved from: <http://www.adobe.com/acom/connectnow/> on Oct. 13, 2010, (2010), 6 pages.

(56) References Cited

OTHER PUBLICATIONS

"An Overview of Aabel 3Features", Retreived From: http://www.gigawiz.com/aabel3.html, Aug. 9, 2011, 21 pages.
"Aquatic Sugar: The Children's Interface, Translated for Adults", Retrieved From: http://www.olpcnews.com/software/operating_system/aquatic_sugar_childrens_interface.html, Nov. 7, 2007, 5 pages.
"Cisco Context-Aware Mobility Solution: Presence Applications", retrieved from https://www.cisco.com/en/US/solutions/collateral/ns340/ns394/ns348/ns788/brochure_c22-497557.html on Sep. 7, 2010, 5 pages.
"Collaboration within the Telepresence Experience", Retrieved From: http://www.wrplatinum.com/downloads/11056.aspx, Jan. 2010, 11 pages.
"CounterPoint User Manual", Retrieved From: http://www.cs.umd.edu/hcil/counterpoint/, 2005, 21 pages.
"CounterPoint: A Zooming Presentation Tool", Retrieved From: http://web.archive.org/web/20050205082738/www.cs.umd.edu/hcil/counterpoint/, Feb. 5, 2005, 3 pages.
"Create Treemaps Using Easy Drag-and-drop Interactions", Retrieved From: http://www.magnaview.nl/treemap/, 2010, 1 page.
"CSS Max-width Property", Retrieved From: http://web.archive.org/web/20070608101036/http://www.w3schools.com/, 2007, 1 page.
"Datapoint version 1.1", Retrieved From: http://www.filedudes.com/DataPoint-download-20853.html, 1997-2007, 2 pages.
"Description for SharePoint Meeting Manager", Retrieved from: <http://www.softpicks.net/software/Business/Project-Management/SharePoint-Meeting-Manager-47146.htm> on Oct. 11, 2010, (Jul. 27, 2009), 2 pages.
"Extended European Search Report", EP Application No. 09803312.9, dated Jul. 7, 2011, 6 pages.
"Final Office Action", U.S. Appl. No. 11/260,515, filed Dec. 11, 2009, 19 pages.
"Final Office Action", U.S. Appl. No. 11/260,515, filed Feb. 24, 2011, 14 pages.
"Final Office Action", U.S. Appl. No. 12/184,174, filed Sep. 6, 2011, 20 pages.
"Final Office Action", U.S. Appl. No. 12/184,174, filed Nov. 20, 2012, 20 pages.
"Final Office Action", U.S. Appl. No. 12/184,174, filed Aug. 11, 2014, 18 pages.
"Final Office Action", U.S. Appl. No. 12/472,101, filed Mar. 28, 2012, 16 pages.
"Final Office Action", U.S. Appl. No. 12/473,206, filed Dec. 7, 2011, 36 pages.
"Final Office Action", U.S. Appl. No. 12/473,206, filed Oct. 8, 2015, 39 pages.
"Final Office Action", U.S. Appl. No. 12/486,762, filed Feb. 8, 2012, 28 pages.
"Final Office Action", U.S. Appl. No. 12/486,762, filed Jun. 20, 2013, 42 pages.
"Final Office Action", U.S. Appl. No. 12/965,965, filed Nov. 8, 2012, 12 pages.
"Final Office Action", U.S. Appl. No. 12/965,965, filed Jun. 5, 2014, 13 pages.
"Final Office Action", U.S. Appl. No. 12/965,965, filed Mar. 11, 2015, 17 pages.
"Final Office Action", U.S. Appl. No. 12/967,497, filed Dec. 3, 2013, 20 pages.
"Final Office Action", U.S. Appl. No. 12/967,497, filed Jul. 2, 2015, 24 pages.
"Final Office Action", U.S. Appl. No. 12/968,332, filed Aug. 1, 2013, 19 pages.
"Final Office Action", U.S. Appl. No. 12/968,332, filed Jul. 17, 2014, 23 pages.
"Final Office Action", U.S. Appl. No. 12/978,308, filed Apr. 9, 2013, 21 pages.
"Final Office Action", U.S. Appl. No. 13/253,886, filed Feb. 14, 2014, 26 pages.
"Final Office Action", U.S. Appl. No. 13/272,832, filed Dec. 30, 2013, 18 pages.
"Foreign Notice of Allowance", CN Application No. 201110436306.8, dated Apr. 1, 2015, 4 pages.
"Foreign Notice of Allowance", CN Application No. 201110436593.2, dated Jun. 4, 2015, 6 pages.
"Foreign Notice of Allowance", RU Application No. 2011103151, dated Sep. 4, 2013, 18 pages.
"Foreign Office Action", CN Application No. 200980131157.5, dated Aug. 31, 2012, 7 pages.
"Foreign Office Action", CN Application No. 200980131157.5, dated Jan. 30, 2013, 7 pages.
"Foreign Office Action", CN Application No. 200980131157.5, dated Jul. 23, 2013, 8 pages.
"Foreign Office Action", CN Application No. 200980131157.5, dated Nov. 21, 2013, 11 pages.
"Foreign Office Action", CN Application No. 201110436306.8, dated Feb. 8, 2014, 13 pages.
"Foreign Office Action", CN Application No. 201110436306.8, dated Sep. 17, 2014, 7 pages.
"Foreign Office Action", CN Application No. 201110436306.8, dated Nov. 15, 2014, 6 pages.
"Foreign Office Action", CN Application No. 201110436593.2, dated Jan. 6, 2014, 11 pages.
"Foreign Office Action", CN Application No. 201110436593.2, dated Sep. 12, 2014, 12 pages.
"Foreign Office Action", CN Application No. 201110436593.2, dated Mar. 16, 2015, 7 pages.
"Foreign Office Action", CN Application No. 201110436635.2, dated May 27, 2014, 14 pages.
"Foreign Office Action", CN Application No. 201110436635.2, dated Nov. 27, 2014, 11 pages.
"Foreign Office Action", CN Application No. 201110436635.2, dated May 18, 2015, 14 pages.
"Foreign Office Action", CN Application No. 201110436635.2, dated Oct. 20, 2015, 12 Pages.
Bell, David et al., "Sensory Semantic User Interfaces (SenSUI) (position paper)", Fluidity Research Group; Brunel University, Oct. 20, 2009, 14 pages.
Bergmann et al., "Automated Assistance for the Telemeeting Lifecycle", Proceedings of the ACM Conference on Computer Supported Cooperative Work, (Oct. 1994), pp. 373-384.
Bunzel, Tom, "Using Quindi Meeting Capture", retrieved from http://www.informit.com/guides/content.aspx?g=msoffice&segNum=220, 09/02/3006, 3 pages.
Derthick et al., "An Interactive Visualization Environment for Data Exploration", Retrieved From: http://www.cs.cmu.edu/?sage/KDD97.html, Aug. 1997, 10 pages.
Fernando et al., "Narrowcasting Attributes for Presence Awareness in Collaborative Virtual Environments pdf", http://ieeexplore.ieee.org/stamp/stamp.jsp?tp=&arnumber=4019930, 2006, 6 pages.
Fruchter, Renate, "Brick & Bits & Interaction (BBI)", http://www.ii.ist.i.kyoto-u.ac.jp/sid/sid2001/papers/positions/brickbitsinteraction.pdf, (2001), 4 pages.
Geyer et al., "Activity Explorer: Activity-centric Collaboration from Research to Product", IBM Systems Journal, IBM® Retrieved From: http://www.research.ibm.com/journal/sj/454/geyer.html., 2006, 26 pages.
Good et al., "CounterPoint: Creating Jazzy Interactive Presentations", Retrieved From: http://drum.lib.umd.edu/bitstream/1903/1121/2/CS-TR-4225.pdf, 2001-2003, 9 pages.
Hewagamage, "Interactive Visualization of Spatiotemporal Patterns Using Spirals on a Geographical Map", Proc. IEEE Symp. Visual Languages, 1999, 8 pages.
Hupfer, "Introducing Collaboration into an Application Development Environment", Retrieved From: http://pnexpert.com/files/IBM_Contextual_Collaboration.pdf, Nov. 6-10, 2004, 4 pages.
Ionescu, Arna et al., "Workspace Navigator: Tools for Capture, Recall and Reuse using Spatial Cues in an Interactive Workspace", Stanford Technical Report TR2002-04, http://bcj.stanford.edu/research/wkspcNavTR.pdf, (2002), 16 pages.
Izadi et al., "Dynamo: A public interactive surface supporting the cooperative sharing and exchange of media", Retrieved From: http://research.microsoft.com/pubs/132613/p159-izadi.pdf, 2003, 10 pages.

(56) References Cited

OTHER PUBLICATIONS

Ju, Wendy et al., "Where the Wild Things Work: Capturing Shared Physical Design Workspaces", Stanford University, CSCW '04, (Nov. 6-10), pp. 533-541.
Karlson et al., "Courier: A collaborative Phone-Based File Exchange System", Retrieved at <<http://docs.google.com/viewer?a=v&q=cache:Mb2OKecuT1kJ:citeseerx.- ist.psu.edu/viewdoc/download%3Fdoi%3D10.1.1146.360%26rep%3Drep1%26type%3D- pdf+collaborative+document+navigation+visual+display+participant+device&hl-=en&pid=bl&srcid=ADGEESgArWqUU1B_J2heHCEm78A3YhBLNjwOzrUuQeMSHPm8FebYGzDX9mSFKGG6RLq1l3MU25cyntlHk5zlolmCFFyGe8wyfYgwMNhwzx8McZbUIL0Og1zr7WR7-http://citeseerx.ist.psu.edu/viewdoc/download?doi=10.1.1.146.360&rep=rep1&type=pdf.
Kim, Hyun H. et al., "SmartMeeting: CMPT 481/811 Automatic Meeting Recording System", http://www.cs.usask.ca/grads/hyk564/homePage/811/CMPT%20811%20final.doc, (2004), 7 pages.
Little, "High-End Business Intelligence with Data Visualization for WPF 4", Retrieved From: http://www.codeproject.com/Articles/90591/High-End-Business-Intelligence-with-Data-Visualization, Jun. 29, 2010, 7 pages.
Mitrovic, Nikola et al., "Adaptive User Interface for Mobile Devices", retrieved from http://citeseerx.ist.psu.edu/viewdoc/download?doi=10.1.1.140.4996&rep=rep- 1&type=pdf, (2002), 15 pages.
Moran et al., "Tailorable Domain Objects as Meeting Tools for an Electronic Whiteboard", Retrieved From: http://pdf.aminer.org/000/121/871/tailorable_domain_objects_as_meeting_tools_for_an_electronic_whiteboard.pdf, 1998, 10 pages.
Nelson, "Just Around the Corner: Visual Fusion 4.5", Retrieved From: http://www.idvsolutions.com/Company/Newsletters/2009/Q3/Vfx45Silverlight.aspx, Sep. 30, 2009, 6 pages.
Peddemors, A.J.H. et al., "Presence, Location and Instant Messaging in a Context-Aware Application Framework", retrieved from http://citeseerx.ist.psu.edu/viewdoc/download?doi=10.11.1.98.3321&rep=rep1-&type=pdf; 4th International Conference on Mobile Data Management, MDM, (2003), 6 pages.
Rudnicky, Alexander I. et al., "Intelligently Integrating Information from Speech and Vision to Perform Light-weight Meeting Understanding", retrieved from http://citeseerx.ist.psu.edu/viewdoc/download?doi=10.1.1.126.1733&rep=rep1&type=pdf, (Oct. 2005), 6 pages.
Shaw, "Create Pan and Zoom Effects in PowerPoint", Retrieved From: http://office.microsoft.com/en-us/powerpoint-help/create-pan-and-zoom-effects-in-powerpoint-HA010232631.aspx, 2007, 13 pages.
Thomas et al., "Through-Walls Collaboration", Retrieved From: http://www.tinmith.net/papers/piekarski-pervasive-2009.pdf, 2009, 8 pages.
Watson, Richard, "What is Mobile Presence?", Retrieved from http://reseller.tmcnet.com/topics/unified-communications/articles/54033-what-mobile-presence.htm, (Apr. 10, 2009), 4 pages.
Wempen, "PowerPoint 2007 Bible", John Wiley & Sons, Feb. 27, 2007, 27 pages.
Werle et al., "Active Documents Supporting Teamwork in a Ubiquitous Computing Environment", Retrieved at <<http://docs.google.com/viewer?a=v&q=cache:iyt-5ZWZURYJ:citeseerx.ist.psu.-edu/viewdoc/download%3Fdoi%3D10.1.1.157.4661%26rep%3Drep1%26type%3Dpdf+sma- rt+layout+document+conference+meeting+where+participant+is+within+the+docu-ment&h1=en&pid=bl&srcid=ADGEEShctdCPK5oM1kGncxGqgHps9wl1DPOjAHtQXOxazPZIShLb_4JN551ty2XiA7lnxhttp://www.pcc.1th.se/events/workshops/2001/pccposters/Werlr.pdf.
Weverka, "PowerPoint 2007 All-in-One Desk Reference for Dummies", Published by Wiley Publishing, Jan. 2007, 8 pages.
Yu, Shoou-Jong et al., "Who Said What When? Capturing Important Moments of a Meeting", retrieved from http://repository.cmu.edu/cgi/viewcontent.cgi?article=1003&context=silicon_valley; Technical Report, (Apr. 10-15, 2010), 7 pages.
Zenghong, Wu et al., "Context Awareness and Modeling in Self-Adaptive Geo-Information Visualization", retrieved from http://icaci.org/documents/ICC_proceedings/ICC2009/html/refer/17_1.pdf on Aug. 30, 2010, 13 pages.
U.S. Appl. No. 12/968,287, Amendment and Response filed May 7, 2014, 12 pages.
U.S. Appl. No. 12/968,287, Amendment and Response filed Jul. 15, 2014, 11 pages.
U.S. Appl. No. 12/968,287, Amendment and Response filed Apr. 13, 2015, 13 pages.
U.S. Appl. No. 12/968,287, Amendment and Response filed Aug. 31, 2015, 7 pages.
U.S. Appl. No. 12/968,287, Amendment and Response filed Dec. 22, 2015, 10 pages.
U.S. Appl. No. 12/968,287, Amendment and Response filed Feb. 12, 2016, 8 pages.
U.S. Appl. No. 12/968,287, Notice of Allowance dated Mar. 1, 2016, 12 pages.
U.S. Appl. No. 12/968,287, Office Action dated Mar. 27, 2014, 20 pages.
U.S. Appl. No. 12/968,287, Office Action dated Jun. 6, 2014, 20 pages.
U.S. Appl. No. 12/968,287, Office Action dated Mar. 27, 2015, 19 pages.
U.S. Appl. No. 12/968,287, Office Action dated Jun. 5, 2015, 22 pages.
U.S. Appl. No. 12/968,287, Office Action dated Nov. 20, 2015, 22 pages.

* cited by examiner

OPTIMIZED JOINT DOCUMENT REVIEW

RELATED APPLICATIONS

This application is a continuation of U.S. patent application Ser. No. 12/968,287, filed Dec. 15, 2010, and entitled "Optimized Joint Document Review," which is hereby incorporated by reference.

BACKGROUND

Joint review of an electronic document often involves a single computer connected to a large-format display device, such as a projector. The program utilized to create the document, such as a word processing application program, is typically utilized to present and navigate the document under review. Document reviewers typically follow along with the display of the document on the large-format display device. In practice, this leads to all of the document reviewers viewing exactly the same content. Moreover, because the user interface provided by the document creation program is not optimized for a large-format display device, the document as presented may be difficult to read.

Some document reviewers might also opt to open a copy of the document under review on their own computing device, such as a laptop computer. The review of the document by these reviewers, however, occurs in a manner that is disconnected from the review of the document by the other reviewers. Consequently, the common joint review practices described above can lead to considerable manual navigation within the document under review, especially for long documents. Moreover, the user interface provided by the document creation program may not be configured to take advantage of enhanced capabilities provided by each reviewer's computing device.

It is with respect to these and other considerations that the disclosure made herein is presented.

SUMMARY

Technologies are described herein for enabling the joint review of documents. Through an implementation of the concepts and technologies presented herein, documents can be reviewed jointly in an efficient and effective manner. In particular, a user interface ("UI") for presenting a document can be optimized based upon the type of computing device being utilized to present the document. For example, a UI that provides functionality for document review may be customized for use on large-format display devices and other device types. Additionally, document navigation mechanisms may be customized with support for touch-enabled display devices and gesture input, UIs for emphasizing portions of a document may be provided, and UIs may be provided for identifying the portions of the documents under review by each reviewer.

According to one aspect presented herein, a group of people, who may be referred to herein individually as "reviewers" or "document reviewers," can jointly review an electronic document. A UI for reviewing the document can be provided that is customized based upon the type of computing device that each reviewer is utilizing. For instance, unique UIs can be provided for desktop or laptop computers, tablet computing devices, wireless mobile telephones, and large-format displays. Each UI can be customized to take advantage of the available user input mechanisms. For instance, the UIs may be optimized for touch input, gestures, and other types of input. Moreover, the location of each reviewer within a document under review may be shared between the devices, communicated to the reviewers, and utilized to assist in document navigation.

According to another aspect, a UI is provided for joint review of a document. In one implementation, the UI is configured for use on a large-format display device, such as a large touch-enabled video display. The UI includes a first UI element, such as a UI pane, showing a view of the document under review. When a large-format display device is utilized, the view may be sized and formatted for display on a large-format display device. For instance, a font style and size may be selected that are appropriate for viewing the document from a distance. Additionally, pagination and other elements traditionally associated with a paper document might not be displayed in the view of the document shown in the first UI pane. Conventional UI tools for editing a document might also be eliminated from the UI. The view of the document shown in the first UI pane may be navigated utilizing touch input, gestures, or other supported UI mechanisms.

The UI might also include a second UI element, such as a second UI pane. The second UI pane might include indicators for each of the reviewers of the document. Each indicator might include data identifying the reviewer, an image of the reviewer, data indicating the type of review being performed (e.g. reading or editing), and an indication of the type of device being utilized (e.g. a tablet or a phone). In one implementation, the selection of an indicator will cause a portion of the document being reviewed by the corresponding reviewer to be displayed in the first UI pane. In this manner, the indicators can be utilized to quickly navigate to the portion of the document under review by each of the reviewers. In alternate embodiments, one reviewer can "push" their location in a document to other reviewers, thereby allowing one reviewer to synchronize their location in a document to other reviewers. Additionally, the view shown to each reviewer might automatically follow along with the location of another reviewer.

According to another aspect, the UI also includes a third UI element, such as a third UI pane, for enabling navigation of the document shown in the first UI pane in a manner optimized for a particular display size and input type. For instance, in one embodiment the third UI pane includes a scaled image, such as a "thumbnail" image, of the document shown in the first UI pane. Selection of a portion of the scaled image causes the selected portion of the document to be displayed in the first UI pane. The UI might also be optimized for a particular display size and input type. For instance, on a large display, a visual thumbnail might be provided in the manner described above that can be utilized to quickly navigate the document with simple gestures. On a smaller display, such as a mobile telephone, the third UI pane might include a mechanism for navigating between headings in the document rather than a thumbnail. Other variations might also be utilized.

In other embodiments, the third UI pane includes a view of sections of the document. Selection of a section of the document in the third UI pane causes the selected section of the document to be displayed in the first UI pane. The third UI pane might also provide an indication of recent viewing or editing activity within the document by the reviewers. The third UI pane might also provided functionality for browsing by heading, figures, or other document elements. The view shown in the third pane might also be utilized to navigate the document independently of the view shown in the first UI pane.

According to another aspect, the first UI pane can be utilized to emphasize a portion of the document. For instance, in one embodiment a portion of the document, such as a paragraph, can be selected in the first UI pane. In response to the selection of a portion of the document, the other portions of the document shown in the first UI pane may be obfuscated. For instance, the other portions of the document may be "blurred" or "fogged" over, thereby rendering the other portions unreadable. In this manner, the attention of the reviewers may be focused on a selected portion of the document.

The UI elements disclosed herein and the user experience provided for interacting with those panes might also be customized based upon the type of device utilized by each reviewer. For example, when a sufficiently large display is available, each pane may be displayed separately or also inline with the document being reviewed. On a mobile telephone the panes may be displayed individually and UI elements may be provided for allowing a user to navigate between the panes. It should be appreciated that although UI panes have been utilized herein to describe various features, other types of UI elements such as "fly out" menus, overlays, and other types of UI elements and UI controls might also be utilized.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
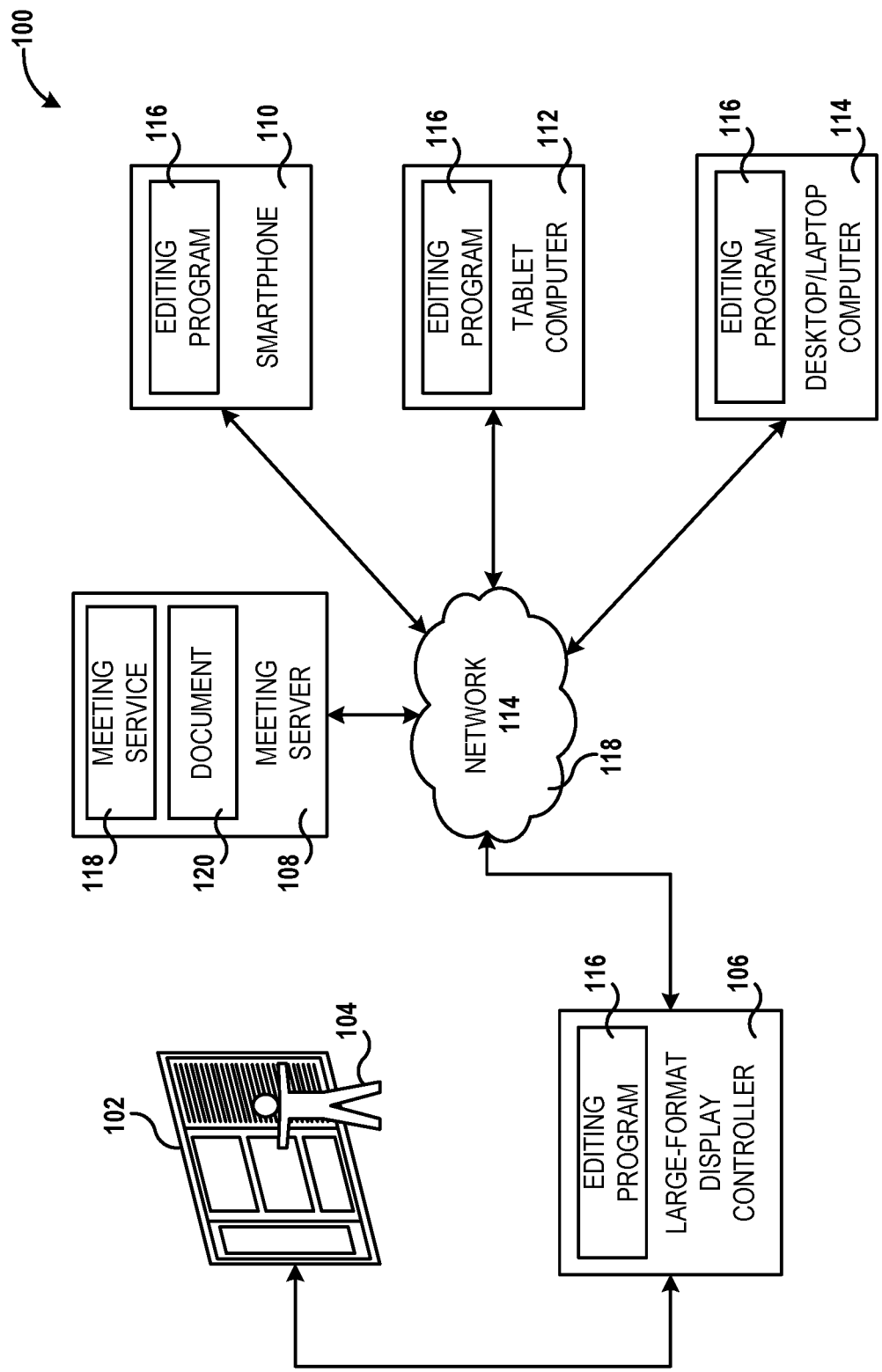
FIG. 1 is a software and network architecture diagram showing one illustrative operating environment for the embodiments disclosed herein.

The following detailed description is directed to technologies for optimized joint document review. As discussed briefly above, a UI for presenting and reviewing a document is disclosed herein that is optimized based upon the type of computing device being utilized to present the document. One such UI includes a first pane showing a view of the document under review that is sized and formatted for display on a large-format display device. The first pane can also be utilized to emphasize a portion of the document. The UI also includes a second pane that includes indicators for each of the reviewers of the document. The selection of an indicator will cause a portion of the document being reviewed by the corresponding reviewer to be displayed in the first pane. The UI also includes a third pane that includes a scaled image of the document shown in the first pane. Selection of a portion of the scaled image causes the selected portion of the document to be displayed in the first pane. Additional details regarding this UI and others will be provided below.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for optimized joint document review will be described.

FIG. 1 is a software and network architecture diagram showing one illustrative operating environment 100 for the embodiments disclosed herein. The illustrative operating environment 100 shown in FIG. 1 includes a number of computing devices that can be utilized by a group of people, who may be referred to herein as "reviewers" or "document reviewers", to jointly review an electronic document 120. For instance, in the example shown in FIG. 1, a smartphone 110, tablet computer 112, and a desktop or laptop computer 114 are being utilized to jointly review the document 120. Additionally, in the example shown in FIG. 1, a reviewer 104 is interacting with a large-format display device 102 in order to review the document. Other reviewers might also be present at the location of the large-format display device 102. The large-format display device 102 is driven by a large-format display controller 106. The large-format display controller 106 may be a computer system configured appropriately for driving the large-format display device 102.

As shown in FIG. 1, the large-format display controller 106, smartphone 110, tablet computer 112, and desktop/laptop computer 114 are each configured to execute an editing program 116. The editing program 116 is a program configured for creating and editing the document 120. As will be described in greater detail below, the editing program 116 is also configured in embodiments herein for providing functionality for allowing the document 120 to be jointly reviewed by users of the large-format display device 102, smartphone 110, tablet computer 112, and desktop/laptop computer 114. According to implementations, the editing program 116 may be a program for creating and editing word processing documents, presentation documents, spreadsheet documents, or other types of electronic documents. It should be appreciated that different versions of the editing program 116 can be executed on each of the devices shown in FIG. 1. The different versions may be configured to interoperate in the manner disclosed herein.

In one implementation, a meeting server 108 is utilized to coordinate the review of the document 120. In this regard, the meeting server 108 may execute a meeting service 118. Through the use of the meeting service 118, a meeting may be scheduled for reviewing the document 120. Appropriate invitations may be sent to the individuals that will be reviewing the document 120. The meeting server 108 might also provide other functionality for facilitating, scheduling, and managing a document review meeting. It should be appreciated that while the document 120 is illustrated in FIG. 1 as being stored at the meeting server 108, the document 120 may be stored in any location accessible to the editing program 116. It should also be appreciated that the embodiments disclosed herein might be implemented without the use of the meeting server 108.

It should be appreciated that each of the computing devices illustrated in FIG. 1 may provide various types of user input mechanisms and various output capabilities. For instance, the large-format display device 102 may include touch input capabilities allowing the reviewer 104 to provide input to the editing program 116 executing on the large-format display controller 106 by touching the large-format display device 102. In this regard, the editing program 116 might support the use of touch gestures to indicate various types of input.

The smartphone 110 might also support touch input, but typically includes a small-scale display screen. In other embodiments, the smartphone 110 might not provide touch input. The tablet computer 112 might provide touch input on a medium-sized display screen and the desktop/laptop computer 114 may or may not be equipped with touch input and may provide a medium-sized display.

As will be described in greater detail below, the editing program 116 provides a UI for presenting and collaboratively reviewing the document 120 that is optimized based upon the type of computing device utilized to present the document. For instance, in one implementation, a UI is provided for document review that is customized for use on the large-format display device 102. In alternative embodiments, the UI might be customized for use on the smartphone 110, the tablet computer 112, and the desktop/laptop computer 114.

As will also be described in greater detail below, the editing program 116 executing on each of the devices in FIG. 1 may be configured to provide an indication of the location within the document 120 currently under review by a user of the respective device. UIs may be provided herein that identify the portions of the document 120 under review by each reviewer and that permit easy navigation to the portions of the document currently under review. Moreover, UIs are provided that permit one reviewer to "push" their location in a document to other reviewers, thereby allowing one reviewer to synchronize their location in a document to other reviewers. Additionally, the view shown to each reviewer might automatically follow along with the location of another reviewer. Additionally, UIs will be described herein for emphasizing portions of the document 120 when used in a group review session setting, such as through the use of the large-format display device 102. Additional details regarding these UIs will be provided below with reference to FIGS. 2-5.

It should be appreciated that although FIG. 1 illustrates four computing devices executing the editing program 116, many other such devices might be utilized by the concepts and technologies presented herein. Additionally, it should be appreciated that while a single network 118 is illustrated in FIG. 1 that connects the computing devices, many other such networks might be utilized. Moreover, although a meeting server 108 and meeting service 118 have been illustrated in FIG. 1, it should be appreciated that the embodiments described herein are not dependent upon the use of a meeting server 108 or a meeting service 118 to organize and facilitate a review meeting.

Figure 2:
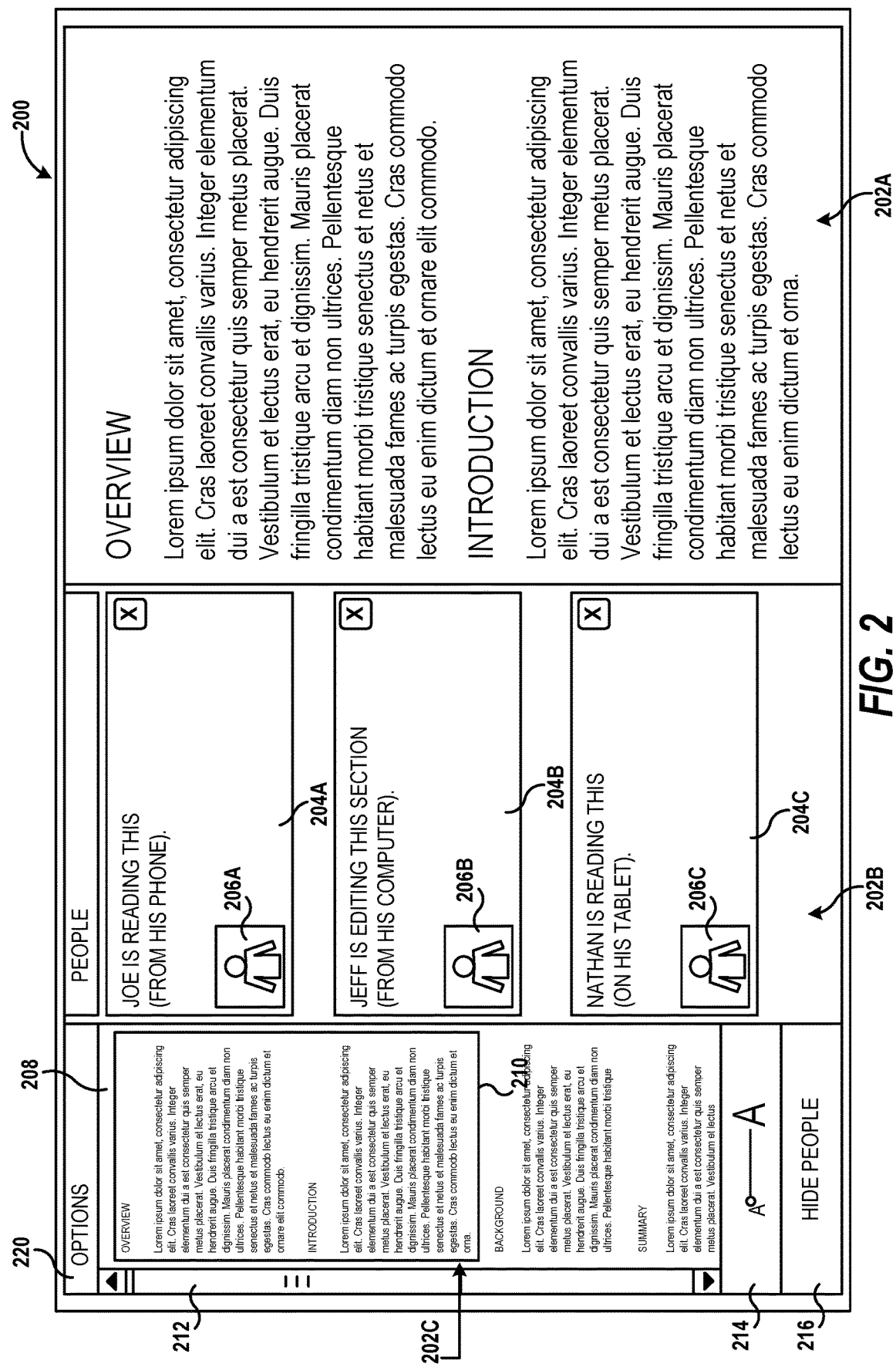
FIG. 2 is a user interface diagram showing one illustrative user interface disclosed herein for optimized document presentation and navigation on a large-format display device, according to one embodiment disclosed herein.

FIG. 2 is a UI diagram showing one illustrative UI disclosed herein for optimized document presentation and navigation on a large-format display device 102, according to one embodiment disclosed herein. In particular, FIG. 2 shows a UI 200 suitable for joint review of a document on the large-format display device 102. In the particular embodiment shown in FIG. 2, the UI 200 includes three UI panes 202A-202C. The UI pane 202A includes a view of the document 120 that is sized and formatted for display on the large-format display device 102. For instance, a font style and size may be selected that are appropriate for viewing the document 120 from a distance. Additionally, the view of the document 120 shown in the pane 202A is simplified to remove pagination and other elements traditionally associated with a paper document. In this regard, the UI 200 also does not include conventional UI tools for editing a document. In this manner, the UI 200 is focused on review of the document 120 rather than editing of the document 120.

The pane 202A may be utilized to navigate the contents of the document 120. For instance, a touch enabled large-format display device 102 may be utilized to make input into the pane 202A for scrolling the visible portion of the document 120 up or down. As an example, a "swipe" touch gesture might be utilized to scroll the view of the document 120 shown in the pane 202A. Other types of gestures might also be made into the pane 202A to scroll the view of the document 120 visible within the pane 202A.

According to one implementation, no editing of the document 120 is permitted within the pane 202A. According to another embodiment, simple editing functionality may be provided within the pane 202A, such as functionality for generating an ink drawing, highlighting a portion of the document 120, or inserting comments into the document 120. In general, it should be appreciated, however, that the pane 202A is configured in a manner so as to avoid inadvertent modification of the document 120.

As shown in FIG. 2 and described briefly above, the UI 200 also includes a UI pane 202B. The UI 202B includes indicators 204A-204C for each of the reviewers of the document 120. Each of the indicators 204A-204C includes an image 206A-206C of the corresponding reviewer, text indicating the type of review being performed (e.g. reading or editing), and an indication of the type of device being utilized (e.g. a tablet or a phone). For instance, the indicator 204A indicates that a reviewer named "Joe" is reading the document 120 from his smartphone 110. The indicator 204B indicates that a reviewer named "Jeff" is editing the section of the document 120 shown in the pane 202A from his computer 114. The indicator 204C indicates that a reviewer named "Nathan" is reading the document 120 on a tablet computer 112. It should be appreciated that while three indicators 204A-204C are illustrated in FIG. 2, more or fewer indicators may be shown in the pane 202B depending on the number of individuals currently reviewing the document 120. Additionally, it should be appreciated that an appropriate user input mechanism might be utilized to scroll the contents of the pane 202B when the number of indicators 204A-204C exceed the available space within the pane 202B.

According to one implementation disclosed herein, the indicators 204A-204C may be selected in order to navigate the view of the document 120 shown in the pane 202A to the portion of the document currently being reviewed by the corresponding reviewer. For instance, the indicator 204A may be selected. In response there to, the portion of the document 120 shown in the pane 202A may be modified to show the portion of the document 120 currently being read by the user named "Joe". Likewise, the indicator 204C might be selected in order to cause the view of the document 120 shown in the pane 202A to reflect the portion of the document 120 being read by the user named "Nathan" on his tablet 112. In this manner, the indicators 204A-204C can be utilized to quickly navigate to the portion of the document 120 under review by each of the reviewers.

It should be appreciated that, in alternate embodiments, one reviewer can "push" their location in a document to other reviewers, thereby allowing one reviewer to synchronize their location in a document to other reviewers. For instance, a reviewer utilizing a mobile telephone to review a document could "push" their location in the document to other reviewers using desktop computers or other types of devices. Additionally, the view shown to each reviewer might automatically follow along with the location of another reviewer.

As also shown in FIG. 2 and described briefly above, the user interface 200 also includes a UI pane 202C. The UI pane 202C includes a scaled image 208, such a "thumbnail" image, of the document 120 currently under review. The UI pane 202C might also include a bounding box 210 that indicates the portion of the document 120 currently being shown in the pane 202A. The user may select a portion of the scaled image 208 shown in the pane 202C. In response thereto, the portion of the document 120 corresponding to the selection made in the pane 202C will be displayed in the pane 202A. In this manner, virtually any portion of the document 120 can be quickly navigated to.

In one implementation, the pane 202C also includes a traditional scroll bar 212 in the event that the scaled image 208 exceeds the available space in the pane 202C. The scroll bar 212 may be utilized to scroll the view of the scaled image 208. The pane 202C might also include a UI control 214 for modifying the font size of the view of the document 120 shown in the pane 202A, a UI control 216 for hiding the pane 202B, a UI control for editing the document 120 in the editing program 116, and a UI control 220 for setting other options regarding the operation of the UI 220.

According to other embodiments, the pane 202C might include a visualization of sections or elements within the document 120. For instance, the pane 202C might include a visualization of the pages, headers, embedded content, comments, sections, or other elements within the document 120. By selecting any of the visualizations within the pane 202C, a user may quickly modify the view of the document 120 shown in the pane 202A to reflect the selected portion of the document. In this manner, the pane 202C may be utilized to quickly navigate to virtually any portion of the document 120. The pane 202C might also provide an indication of the portion of the document 120 currently being reviewed by each reviewer.

It should be appreciated that the UI elements disclosed herein and the user experience provided for interacting with those panes might also be customized based upon the type of device utilized by each reviewer. For example, when a sufficiently large display is available, each pane may be displayed separately or also inline with the document being reviewed. On a mobile telephone the panes may be displayed individually and UI elements may be provided for allowing a user to navigate between the panes.

Figure 3:
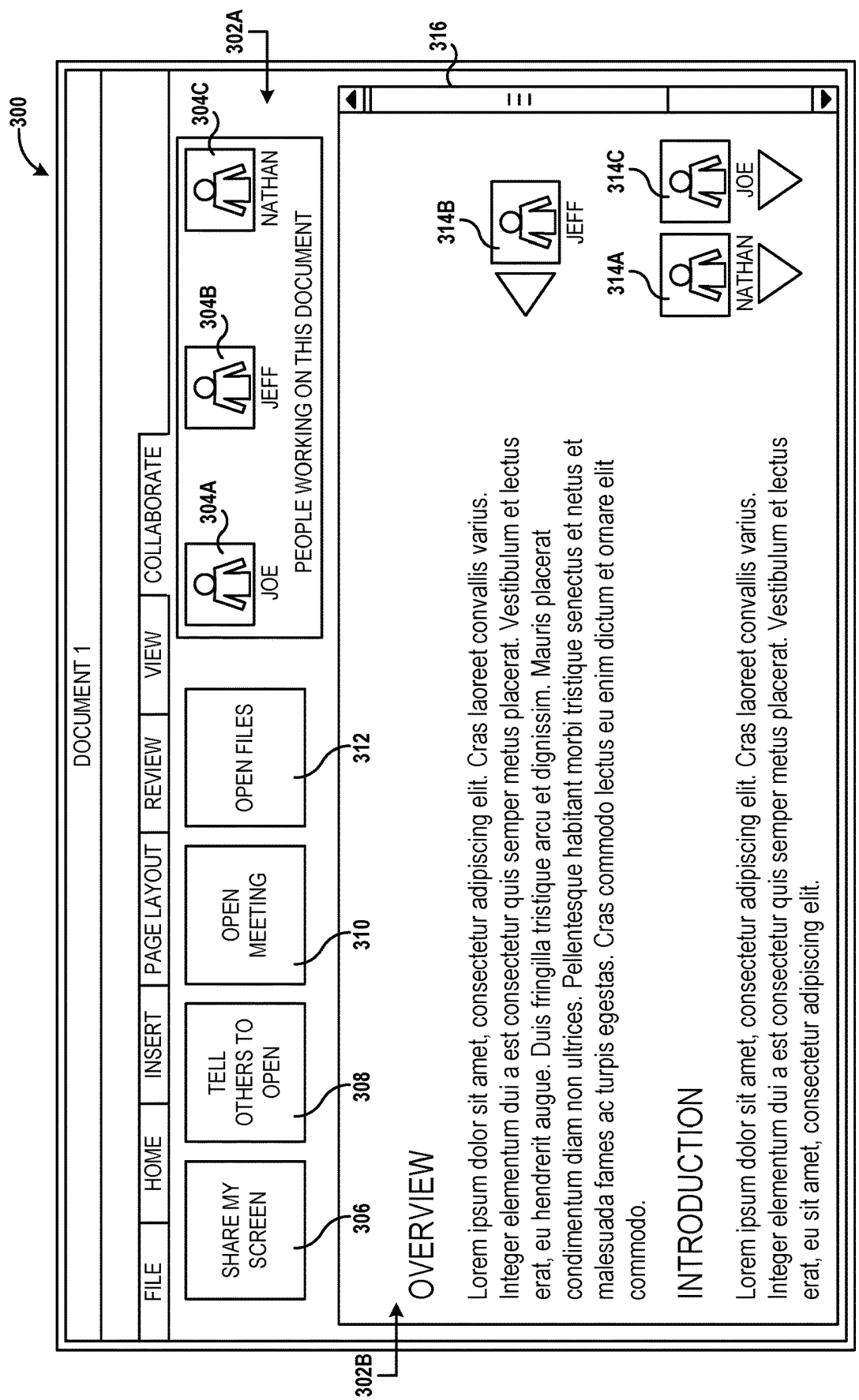
FIG. 3 is a user interface diagram showing one illustrative user interface disclosed herein for optimized document presentation and navigation on a desktop or laptop computer, according to one embodiment disclosed herein.

FIG. 3 is a UI diagram showing one illustrative UI disclosed herein for optimized document presentation and navigation on a desktop or laptop computer, according to one embodiment disclosed herein. In particular, FIG. 3 shows a UI 300 that may be displayed by a desktop/laptop computer 114 or another computing device having an average-sized display screen. In the UI shown in FIG. 3, a UI pane 302A includes indicators 304A-304C identifying the reviewers currently reviewing the document 120.

The indicators 304A-304C may include images or text identifying the user, the type of review in progress, the type of device upon which the review is being performed, and other information. The pane 302A might also include UI controls for performing other review and related tasks, such as a UI control 306 for screen sharing, a UI control 308 for requesting that other users open the document 120, a UI control 310 for opening a meeting, and a UI control 312 for opening other meeting files.

The UI 300 shown in FIG. 3 also includes a UI pane 302B. The UI pane 302B provides a view of the document 120. The view of the document 120 shown in the pane 302B may be navigated in a traditional fashion utilizing the scroll bar 316 or other user input mechanisms.

In the example shown in FIG. 3, the view of the document 120 shown in the pane 302B also includes the indicators 314A-314C. The indicators 314A-314C identify the reviewers currently reviewing the document shown in the pane 302B. Additionally, the indicators 314A-314C provide an indication as to the portions of the document 120 currently under review. For instance, in the example shown in FIG. 3, the indicator 314B includes an arrow pointing at the overview section of the document 120. This indicates that the user named "Jeff" is currently reviewing this portion of the document 120. The indicators 314A and 314C include arrows pointing off screen. These indicators show that the users named "Joe" and "Nathan" are currently reviewing portions of the document 120 that are below the portion shown in pane 302B. The indicators 314A-314C may be selected in order to navigate the view of the document 120 shown in the pane 302B to the portion of the document 120 currently under view by the respective reviewer.

Figure 4:
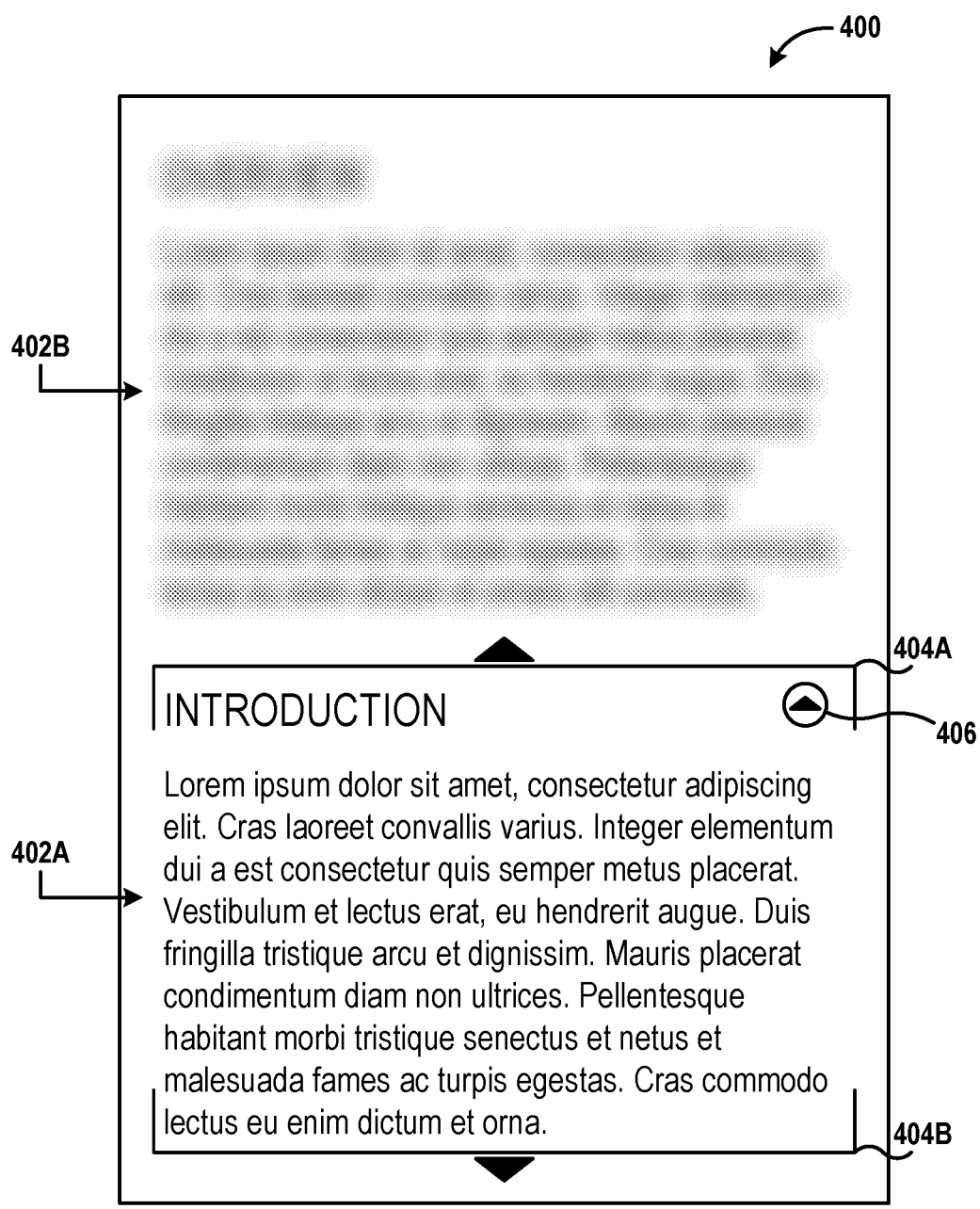
FIG. 4 is a user interface diagram showing one illustrative user interface disclosed herein for emphasizing a portion of a document, according to one embodiment disclosed herein.

FIG. 4 is a UI diagram showing one illustrative UI disclosed herein for emphasizing a portion of a document, according to one embodiment disclosed herein. In particular, FIG. 4 shows a UI 400 that may be utilized within the UI 200 or the UI 300 to emphasize a portion of the document 120. In the UI 400, a portion 402A of the document 120 may be selected. For instance, selection may be made utilizing an appropriate touch-enabled input device. Once the portion 402A of the document 120 has been selected, a request may be received in order to emphasize the selected portion 402A. An appropriate UI gesture or other type of user input may be received in order to make such a request.

In response to receiving a request to emphasize the selected portion 402A, the editing program 116 is configured to obfuscate the other portions of the document 120 displayed in the UI 400. For instance, the portion 402B of the document 120 may be "blurred" or "fogged" over, thereby rendering the portion 402B of the document 120 unreadable. Additionally, the text size or other visual attributes of the portion 402A may be emphasized. For instance, the font size of text within the portion 402 may be increased. Additionally, separators 404A-404B may be displayed to further distinguish the portion 402A of the document 120 from the remaining portion 402B of the document 120. It should be appreciated that other types of visual effects might also be applied to the non-selected portion 402B of the document 120. A UI control 406 might also be displayed which, when selected, will cause the emphasis to the portion 402A to be removed from the UI 400. In this manner, the attention of the reviewers may be focused on the selected portion 402A of the document 120.

It should be appreciated that the user interfaces as illustrated in FIGS. 2-4 and described above are merely illustrative and that other implementations may be utilized. It should be further appreciated that the various UI components illustrated in FIGS. 2-4 and described above may be used in combination. For instance, the UI 400 may be utilized in the UI pane 202A shown in FIG. 2 or the UI pane 302 shown in FIG. 3. Similarly, the indicators 314A-314C might be utilized in the UI pane 202A or the UI pane 202C.

Figure 5:
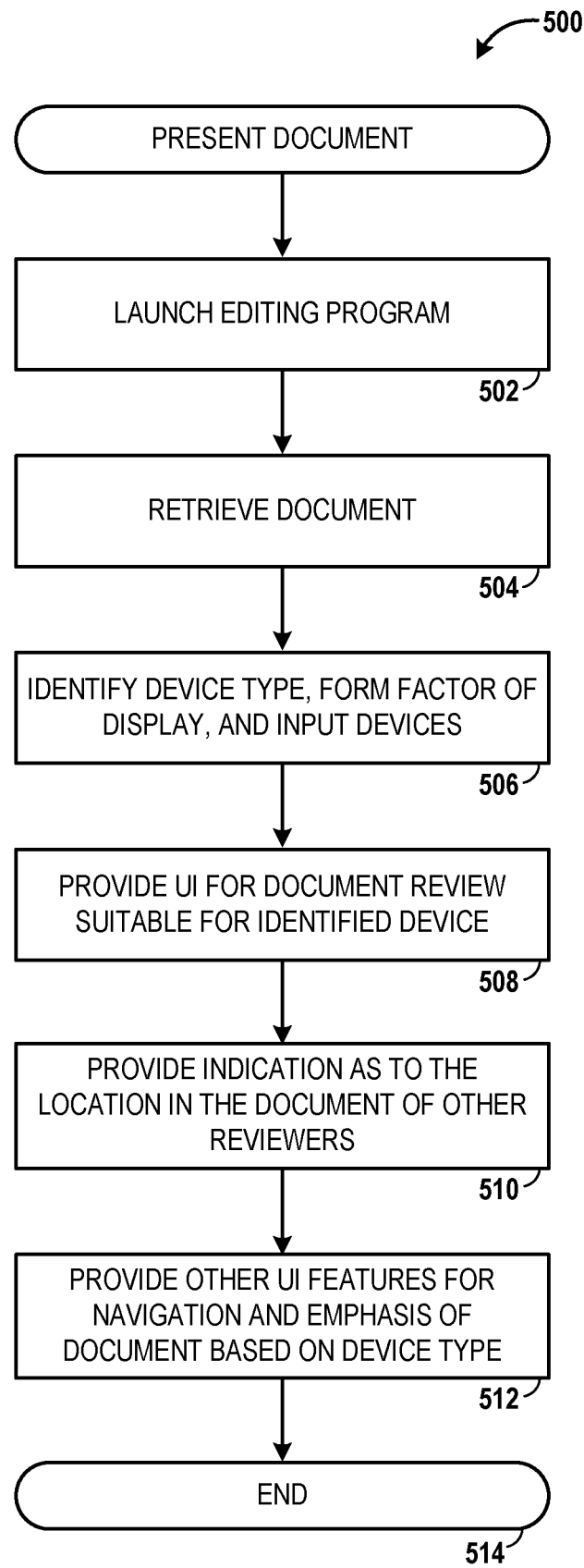
FIG. 5 is a flow diagram showing aspects of one illustrative process disclosed herein for optimized document presentation and navigation for presenting a document in a meeting, according to one embodiment presented herein.

FIG. 5 is a flow diagram showing a routine 500 that illustrates aspects of one process disclosed herein for optimized document presentation and navigation for presenting a document in a meeting. It should be appreciated that the logical operations described herein with respect to FIG. 5 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 500 begins at operation 502, where the editing program 116 is launched on the various devices utilized to review the document 120. For instance, as described above, the editing program 116 may be launched on the large-format display controller 106, the smartphone 110, the tablet computer 112, and the desktop/laptop computer 114. Once the editing program 116 has been launched, the routine 500 proceeds to operation 504.

At operation 504, the editing program 116 retrieves the document 120 to be jointly reviewed. The routine 500 then proceeds to operation 506 where the editing program 116 identifies the device type, display form factor, and input devices of the device upon which it is executing. Once these items have been identified, the routine 500 then proceeds to operation 508 where the editing program 116 provides a user interface customized for reviewing the document 120 that is suitable for the display and user input mechanisms provided by the identified device. For instance as described above, the UI 200 shown in FIG. 2 may be provided by the editing program 116 executing on the large-format display controller 106. Similarly, the UI shown in FIG. 3 and described above may be provided by the editing program 116 executing on the desktop/laptop computer 114. Additionally, various aspects of the UIs described herein might be provided by a suitable UI on the smartphone 110 and the tablet computer 112.

From operation 508, the routine 500 proceeds to operation 510. At operation 510, the editing program 116 executing on each device provides an indication to the other devices as to the location in the document currently being reviewed. Each of the editing programs 116 receives this information and provides an indication as to the location in the document of the other reviewers. For instance, the contents of the pane 202B described above with reference to FIG. 2 may be provided indicating the location of reviewers within the document 120. Similarly, the indicators 314A-314C may be displayed showing the location within the document 120 currently being reviewed by the other reviewers.

From operation 510, the routine 500 proceeds to operation 512 where the editing program 116 also provides other UI features for navigating the document 120 and emphasizing portions of the document 120 for review. These features may be based upon the particular device type upon which each instance of the editing program 116 is executing. These features were described above with reference to FIGS. 2-5. From operation 512, the routine 500 proceeds to operation 514, where it ends.

Figure 6:
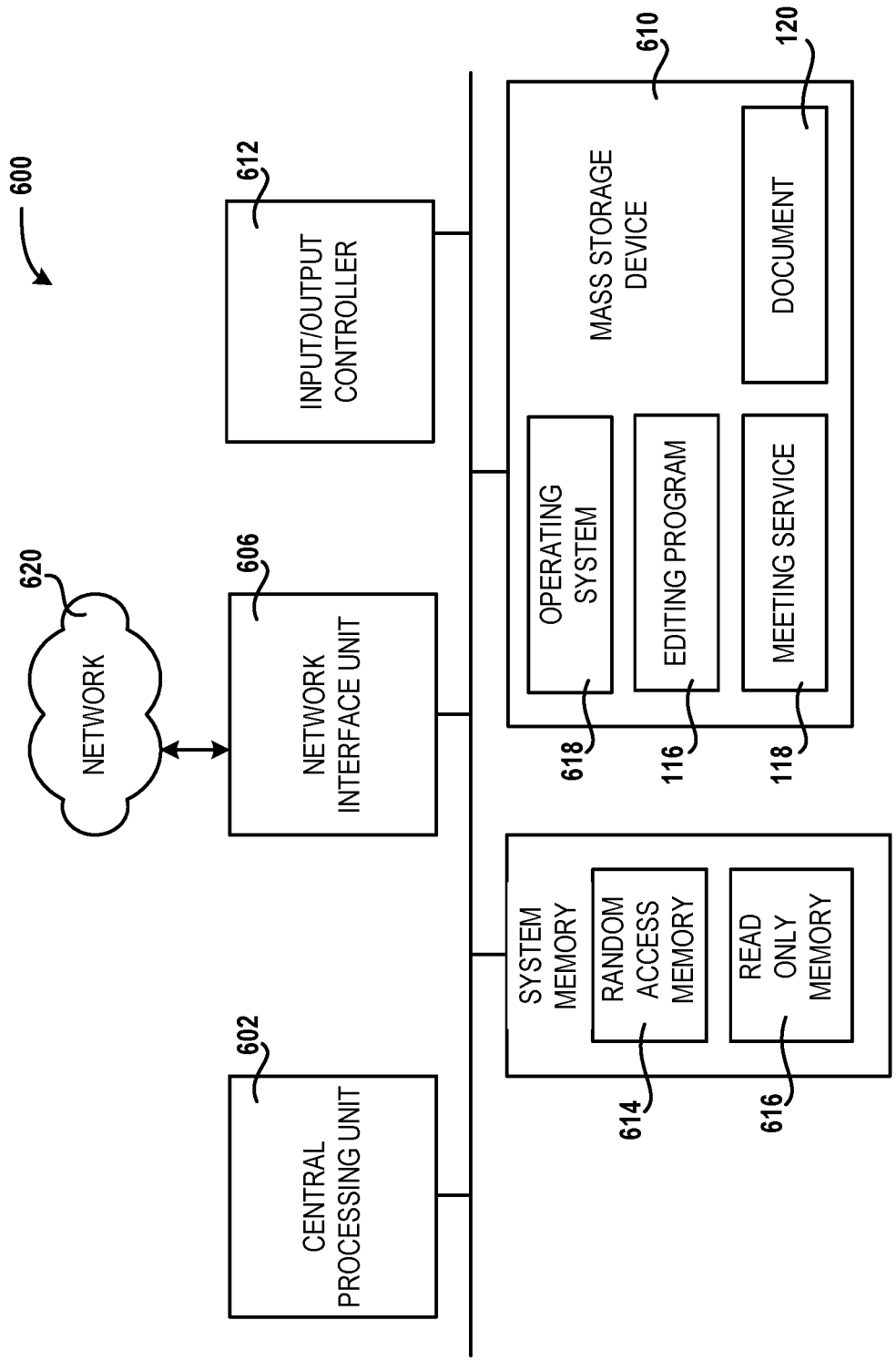
FIG. 6 is a computer architecture diagram showing an illustrative computer hardware and software architecture for a computing system capable of implementing the various embodiments presented herein.

FIG. 6 is a computer architecture diagram showing an illustrative computer hardware and software architecture for a computing system capable of implementing the various embodiments presented herein. The computer architecture shown in FIG. 6 illustrates a conventional desktop, laptop computer, or server computer and may be utilized to execute the various software components described herein.

The computer architecture shown in FIG. 6 includes a central processing unit 602 ("CPU"), a system memory 608, including a random access memory 614 ("RAM") and a read-only memory ("ROM") 616, and a system bus 604 that couples the memory to the CPU 602. A basic input/output system ("BIOS") containing the basic routines that help to transfer information between elements within the computer 600, such as during startup, is stored in the ROM 616. The computer 600 further includes a mass storage device 610 for storing an operating system 618, application programs, and other program modules, which will be described in greater detail below.

The mass storage device 610 is connected to the CPU 602 through a mass storage controller (not shown) connected to the bus 604. The mass storage device 610 and its associated computer-readable storage media provide non-volatile storage for the computer 600. Although the description of computer-readable media contained herein refers to a mass storage device, such as a hard disk or CD-ROM drive, it should be appreciated by those skilled in the art that computer-readable storage media can be any available computer storage media that can be accessed by the computer 600.

By way of example, and not limitation, computer-readable storage media may include volatile and non-volatile, removable and non-removable media implemented in any method or technology for storage of information such as computer-readable instructions, data structures, program modules or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other non-transitory medium which can be used to store the desired information and which can be accessed by the computer 600.

It should be appreciated that the computer-readable media disclosed herein also encompasses communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. Computer-readable storage media does not encompass communication media.

According to various embodiments, the computer 600 may operate in a networked environment using logical connections to remote computers through a network such as the network 620. The computer 600 may connect to the network 620 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 610 and RAM 614 of the computer 600, including an operating system 618 suitable for controlling the operation of a networked desktop, laptop, or server computer. The mass storage device 610 and RAM 614 may also store one or more program modules. In particular, the mass storage device 610 and the RAM 614 may store the document editing program 116, the meeting service 118, and/or the other software components described above. The mass storage device 610 and RAM 614 may also store other program modules and data, such as the document 120.

In general, software applications or modules may, when loaded into the CPU 602 and executed, transform the CPU 602 and the overall computer 600 from a general-purpose computing system into a special-purpose computing system customized to perform the functionality presented herein. The CPU 602 may be constructed from any number of transistors or other discrete circuit elements, which may individually or collectively assume any number of states. More specifically, the CPU 602 may operate as one or more finite-state machines, in response to executable instructions contained within the software or modules. These computer-executable instructions may transform the CPU 602 by specifying how the CPU 602 transitions between states, thereby physically transforming the transistors or other discrete hardware elements constituting the CPU 602.

Encoding the software or modules onto a mass storage device may also transform the physical structure of the mass storage device or associated computer readable storage media. The specific transformation of physical structure may depend on various factors, in different implementations of this description. Examples of such factors may include, but are not limited to: the technology used to implement the computer readable storage media, whether the computer readable storage media are characterized as primary or secondary storage, and the like. For example, if the computer readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for optimized joint document review have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method, comprising:
displaying a user interface of a document review application on a first computing device, wherein the user interface concurrently displays:
a first user interface element comprising a current view of a document displayed to a first user, the first user being an individual viewing the document on a first display device of the first computing device;
a second user interface element comprising an indicator identifying a second user, the second user being a reviewer of the document different from the first user, the reviewer concurrently reviewing the document on a second display device of a second computing device; and
a third user interface element comprising:
a scaled image of the document, the scaled image of the document being smaller than the current view of the document displayed in the first user interface element;
a bounding box, overlaid on the scaled image of the document, the bounding box indicating the current view of the document displayed in the first user interface element; and
a visual indicator, overlaid on the scaled image of the document, the visual indicator indicating a portion of the document currently being viewed by the reviewer identified in the second user interface element;
in response to receiving a selection of the indicator of the reviewer of the document, displaying, in the first user interface element, the portion of the document currently being viewed by the reviewer.

2. The computer-implemented method of claim 1, further comprising:
receiving a selection of the indicator for the reviewer in the second interface element; and
displaying, in the first user interface element, the portion of the document currently being viewed by the reviewer.

3. The computer-implemented method of claim 1, further comprising:
receiving a selection of a portion of the scaled image in the third user interface element; and
displaying, in the first user interface element, a second portion of the document corresponding to the selected portion of the scaled image.

4. The computer-implemented method of claim 3, further comprising:
in response to receiving the selection of the portion of the scaled image in the third user interface element, moving the bounding box to the portion of the scaled image.

5. The computer-implemented method of claim 1, further comprising:
receiving a selection of a section of the document in the third user interface element; and
displaying, in the first user interface element, a second portion of the document corresponding to the selected section;
wherein the third user interface element comprises a view of one or more sections of the document.

6. The computer-implemented method of claim 1, wherein the third user interface element provides an indication of recent viewing or editing activity within the document by the reviewer.

7. The computer-implemented method of claim 1, wherein the indicator for the reviewer of the document comprises data identifying the reviewer.

8. The computer-implemented method of claim 7, wherein the data identifying the reviewer comprises an image of the reviewer.

9. The computer-implemented method of claim 8, wherein the indicator for the reviewer further comprises data identifying a type of review being performed and a device type being utilized by the reviewer.

10. The computer-implemented method of claim 9, wherein:
the reviewer is a first reviewer;
the indicator is a first indicator;
the second user interface element further comprises a second indicator for a second reviewer of the document; and
the first reviewer and the second reviewer are reviewing the document on a plurality of device types.

11. The computer-implemented method of claim 1, wherein a touch input causes navigation within the first user interface element, the second user interface element, or the third user interface element.

12. A system, comprising:
a processor; and
a memory storing instructions that, when executed by the processor, perform operations, comprising:
displaying a user interface of a document review application on a first computing device, the user interface concurrently displaying a first user interface pane, a second user interface pane, and a third user interface pane, wherein:
the first user interface pane comprises a current view of a document displayed to a first user, the first user being an individual viewing the document on a first display device of the first computing device;
the second user interface pane is adjacent to the first user interface pane and comprises an indicator identifying a second user, the second user being a reviewer of the document different from the first user, the reviewer concurrently reviewing the document on a second display device of a second computing device; and
the third user interface pane is adjacent to the second user interface pane and comprises:
a scaled image of the document, the scaled image of the document being smaller than the current view of the document displayed in the first user interface pane;
a bounding box, overlaid on the scaled image of the document, the bounding box indicating the current view of the document displayed in the first user interface pane; and
a visual indicator, overlaid on the scaled image of the document, the visual indicator indicating a portion of the document currently being viewed by the reviewer identified in the second user interface pane;
in response to receiving a selection of the indicator of the reviewer of the document, displaying, in the first user interface pane, the portion of the document currently being viewed by the reviewer.

13. The system of claim 12, wherein the instructions, when executed, further cause the processor to:
cause a display, in the first user interface pane, of the portion of the document currently being viewed by the reviewer in response to receiving a selection of the indicator for the reviewer.

14. The system of claim 12, wherein the instructions, when executed, further cause the processor to:
cause a display, in the first user interface pane, of a third portion of the document corresponding to a selected portion of the scaled image in response to receiving a selection of a portion of the scaled image.

15. The system of claim 12, wherein the instructions, when executed, further cause the processor to:
obfuscate, in the first user interface pane, any other parts of the document in response to receiving a selection of a third portion of the document in the first user interface pane.

16. The system of claim 12, wherein the third user interface pane provides an indication of recent viewing or editing activity within the document by the reviewer.

17. The system of claim 16, wherein:
the reviewer is a first reviewer;
the indicator is a first indicator;
the second user interface pane further comprises a second indicator for a second reviewer of the document; and
the first reviewer and the second reviewer are reviewing the document on a plurality of device types.

18. A system, comprising:
a processor; and
a memory storing instructions that, when executed by the processor, perform operations, comprising:
causing a display of a user interface of a document review application on a first computing device, the user interface concurrently displaying:
a first user interface pane comprising a current view of a document displayed to a first user, the first user being an individual viewing the document on a first display device of the first computing device;

a second user interface pane adjacent to the first user interface pane, the second user interface pane comprising an indicator identifying a second user, the second user being a reviewer of the document different from the first user, the reviewer concurrently reviewing the document on a second display device of a second computing device; and a third user interface pane adjacent to the second user interface pane, the third user interface pane comprising:

a scaled image of the document, the scaled image of the document being smaller than the current view of the document displayed in the first user interface pane;

a bounding box, overlaid on the scaled image of the document, the bounding box indicating the current view of the document displayed in the first user interface pane; and a visual indicator, overlaid on the scaled image of the document, the visual indicator indicating a portion of the document currently being viewed by the reviewer identified in the second user interface pane;

in response to receiving a selection of the indicator for the reviewer of the document, displaying, in the first user interface pane, the portion of the document currently being viewed by the reviewer.

19. The system of claim 18, wherein the third user interface pane comprises a view of one or more sections of the document.

\* \* \* \* \*